(12) United States Patent
Ueno et al.

(10) Patent No.: US 11,753,099 B2
(45) Date of Patent: Sep. 12, 2023

(54) LEANING VEHICLE

(71) Applicant: YAMAHA HATSUDOKI KABUSHIKI KAISHA, Iwata (JP)

(72) Inventors: Ryo Ueno, Iwata (JP); Akihiro Chiba, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 256 days.

(21) Appl. No.: 16/428,043

(22) Filed: May 31, 2019

(65) Prior Publication Data

US 2019/0283832 A1 Sep. 19, 2019

Related U.S. Application Data

(63) Continuation-in-part of application No. PCT/JP2017/042940, filed on Nov. 30, 2017.

(30) Foreign Application Priority Data

Dec. 1, 2016 (JP) ................................. 2016-234212

(51) Int. Cl.
*B62J 3/14* (2020.01)
*B62K 19/16* (2006.01)
*B62K 11/04* (2006.01)
*B62J 6/24* (2020.01)

(52) U.S. Cl.
CPC . *B62J 3/14* (2020.02); *B62J 6/24* (2020.02); *B62K 11/04* (2013.01); *B62K 19/16* (2013.01)

(58) Field of Classification Search
CPC ........... B62K 19/16; B62K 11/04; B62J 27/00
USPC ...................................................... 280/281.1
See application file for complete search history.

(56) References Cited

U.S. PATENT DOCUMENTS

| 5,236,212 A | * | 8/1993 | Duehring | ............... | B62K 19/30 280/281.1 |
| 5,433,465 A | * | 7/1995 | Klein | ..................... | F16C 1/262 280/281.1 |
| 7,176,448 B2 | * | 2/2007 | Ogisu | ................. | G01M 11/086 250/227.14 |
| 7,574,074 B1 | * | 8/2009 | Huang | ................... | B62K 19/16 385/12 |

(Continued)

FOREIGN PATENT DOCUMENTS

| CA | 2637858 A1 | * | 2/2010 | ............ | B60R 19/32 |
| DE | 102004025794 A1 | * | 4/2006 | ............ | B62J 17/086 |

(Continued)

*Primary Examiner* — Kevin Hurley
*Assistant Examiner* — Marlon A Arce
(74) *Attorney, Agent, or Firm* — Rabin & Berdo, P.C.

(57) ABSTRACT

This leaning vehicle that turns in a leaning posture and has a leaning frame structure made of a material containing fiber-reinforced resin can achieve weight reduction and help reduce changes in ride quality. The vehicle includes a rear structure that leans to the left during a left turn and leans to the right during a right turn with respect to the left-right direction of the vehicle, and is made of a material containing carbon-fiber-reinforced resin, and a leaning frame structure damage notification unit that, when the rear structure receives an impact caused by a fall of the vehicle in the left direction or the right direction, and the impact damages a non-visible part of the rear structure, makes a notification of the damage.

8 Claims, 15 Drawing Sheets

(56) References Cited

U.S. PATENT DOCUMENTS

| | | | | |
|---|---|---|---|---|
| 7,712,828 | B2* | 5/2010 | Julliard | B62K 19/36 |
| | | | | 297/215.13 |
| 8,393,246 | B2* | 3/2013 | Poertner | B62K 23/06 |
| | | | | 74/551.8 |
| 8,459,682 | B2* | 6/2013 | Calfee | B62J 1/08 |
| | | | | 280/288.4 |
| 9,120,525 | B2* | 9/2015 | Colegrove | B62K 19/30 |
| 9,170,172 | B2* | 10/2015 | Hunt | G01B 11/18 |
| 9,346,513 | B2* | 5/2016 | Hsu | B62K 19/02 |
| 9,403,572 | B2* | 8/2016 | Jankura | B29C 70/345 |
| 9,422,024 | B2* | 8/2016 | Al-Sheyyab | B29C 65/02 |
| 10,336,397 | B2* | 7/2019 | Ridet | B62D 21/15 |
| 10,661,851 | B2* | 5/2020 | Ebel | B62J 6/02 |
| 2001/0012469 | A1* | 8/2001 | Hayashi | B62K 11/04 |
| | | | | 403/285 |
| 2011/0062690 | A1* | 3/2011 | Kizaki | B62K 11/04 |
| | | | | 280/735 |
| 2013/0050685 | A1* | 2/2013 | Hunt | G01L 1/246 |
| | | | | 356/73.1 |
| 2013/0161926 | A1* | 6/2013 | Senechal | B62K 19/02 |
| | | | | 280/281.1 |
| 2014/0229054 | A1* | 8/2014 | Gerundt | B62M 6/50 |
| | | | | 701/29.4 |
| 2017/0274952 | A1* | 9/2017 | Cheng | B60C 23/0454 |
| 2018/0093730 | A1* | 4/2018 | Matsuo | B62J 17/00 |
| 2018/0280761 | A1* | 10/2018 | Izuru | A63B 69/16 |
| 2019/0161042 | A1* | 5/2019 | Fuchs | G08G 1/167 |

FOREIGN PATENT DOCUMENTS

| | | | |
|---|---|---|---|
| EP | 3054154 A1 | 8/2016 | |
| EP | 3335973 A1 * | 6/2018 | B29C 70/885 |
| JP | S5634358 A | 4/1981 | |
| JP | S60114741 * | 6/1985 | G01N 3/32 |
| JP | S60114741 A | 6/1985 | |
| JP | S62231142 * | 9/1985 | B64D 45/00 |
| JP | S62231142 A | 10/1987 | |
| JP | H0899364 A | 4/1996 | |
| JP | 2001030971 A | 2/2001 | |
| JP | 2004138392 * | 5/2004 | G01N 2291/0289 |
| JP | 2004138392 A | 5/2004 | |
| JP | 2007307944 A | 11/2007 | |
| JP | 2009256449 A | 11/2009 | |
| JP | 2010062030 A * | 3/2010 | |
| JP | 2015186979 A * | 10/2015 | |
| JP | 2015186979 A | 10/2015 | |
| JP | 2016105104 A | 6/2016 | |
| JP | 2016142237 A | 8/2016 | |
| KR | 20080033921 A * | 4/2008 | B60R 21/013 |
| KR | 20130007353 A * | 1/2013 | |
| WO | WO-2015159197 A1 * | 10/2015 | B62J 15/00 |
| WO | 2016102034 A1 | 6/2016 | |
| WO | WO-2018171997 A1 * | 9/2018 | B62K 21/02 |

* cited by examiner

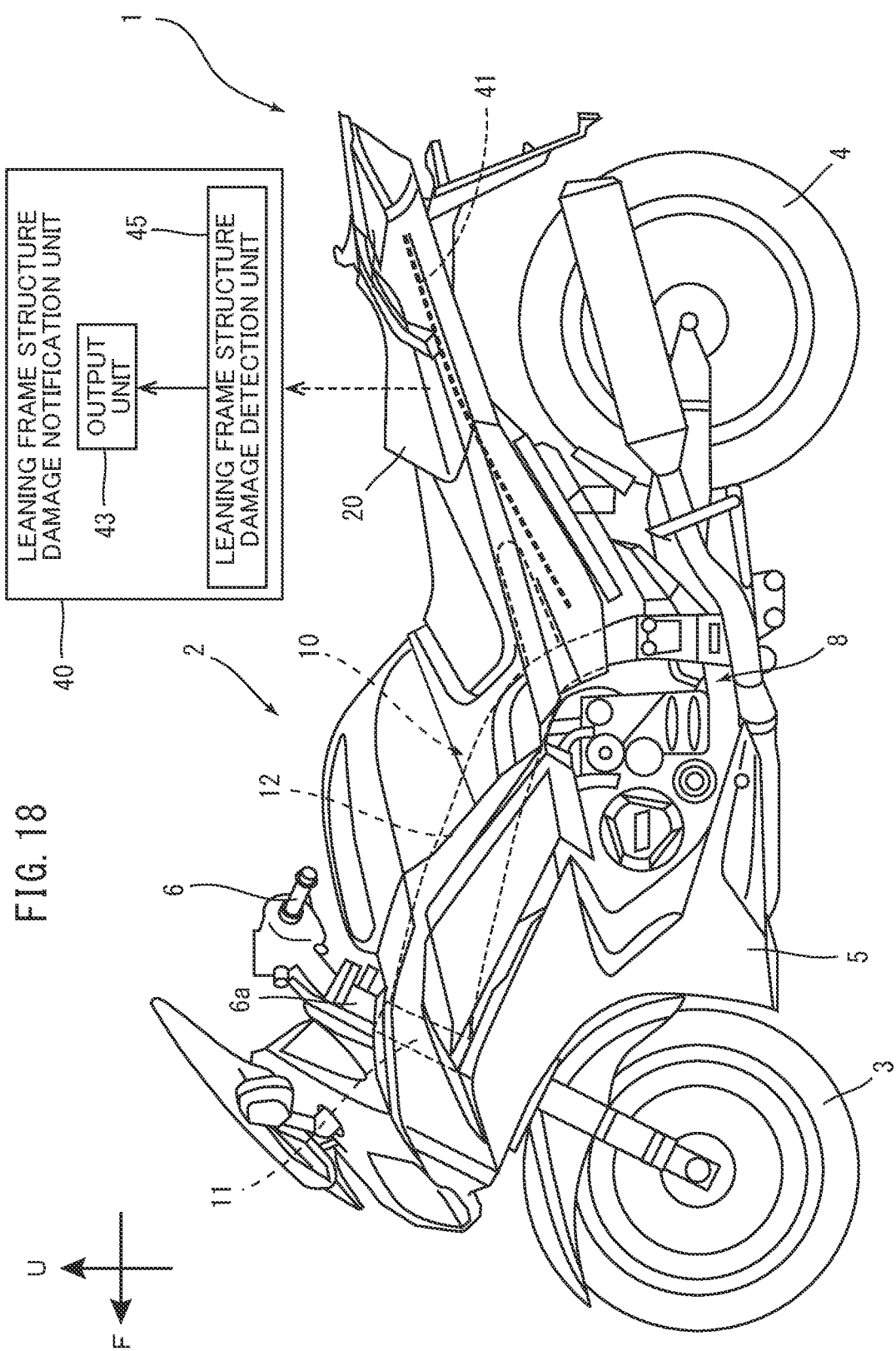

LEANING VEHICLE

CROSS-REFERENCES TO RELATED APPLICATIONS

The present application is a continuation-in-part application of International Application No. PCT/JP2017/042940, filed on Nov. 30, 2017, and having the benefit of the earlier filing date of Japanese Application No. 2016-234212, filed on Dec. 1, 2016. The content of each of the identified applications is incorporated herein by reference in its entirety.

BACKGROUND

Technical Field

This teaching relates to leaning vehicles that turn in a leaning posture.

Background Art

A known example of the leaning vehicles that turn in a leaning posture is a two-wheeled motorcycle disclosed in Patent Document 1 (identified further on). The vehicle disclosed in Patent Document 1 includes an upper frame and a lower frame, each of which is a single-piece component made of fiber-reinforced resin containing carbon fibers. The upper frame and the lower frame are combined by coupling an upper head pipe provided to the upper frame and a lower head pipe provided to the lower frame.

According to the configuration disclosed in Patent Document 1, the frames of the two-wheeled motorcycle are made of the fiber-reinforced resin containing carbon fibers to decrease the weight and increase the strength.

CITATION LIST

Patent Document

Patent Document 1: Japanese Patent Application Publication No. 2007-307944

SUMMARY OF THE INVENTION

The inventors of the present teaching have anticipated various operating environments for a leaning vehicle, which turns in a leaning posture, including a leaning frame structure made of a material containing fiber-reinforced resin, and carefully studied how these operating environments affect the leaning vehicle. In this study, the inventors anticipated a plurality of usage scenarios of the leaning vehicle, and studied the effect on the leaning vehicle in the anticipated usage scenarios.

As a result of the keen examination, the inventors found that mixed cases could exist in which the rigidity of the leaning frame structure made of the material containing fiber-reinforced resin became low, and in which the rigidity of the leaning frame structure made of the material containing fiber-reinforced resin did not become low.

In the case where the rigidity of the leaning frame structure made of the material containing fiber-reinforced resin becomes low as described above, the ride quality of the leaning vehicle may change.

The present teaching has an object to provide configurations capable of achieving weight reduction, while helping reduce changes in ride quality, to a leaning vehicle that turns in a leaning posture and has a leaning frame structure made of a material containing fiber-reinforced resin.

If the leaning vehicle that turns in a leaning posture is not supported during a stop, the leaning vehicle falls over in the left direction or the right direction due to its own nature. The plurality of usage scenarios of the leaning vehicle include such a falling accident during a stop. Therefore, the leaning vehicle needs to be designed in consideration of the possibility of such a falling accident during a stop. The inventors studied a plurality of cases to find out the conditions of the leaning vehicle that fell over during a stop.

As a result of the keen examination by the inventors, they found that mixed cases could exist in which the rigidity of the leaning frame structure made of a material containing fiber-reinforced resin became low, and in which the rigidity of the leaning frame structure made of the material containing fiber-reinforced resin did not become low after the leaning vehicle fell over during a stop. In the case where the rigidity of the leaning frame structure is decreased as described above, the ride quality of the leaning vehicle may change.

The inventors studied the conditions of the leaning vehicle that fell over during a stop in greater detail. As a result, the inventors noticed the following.

The leaning vehicle that falls over in the left direction or the right direction touches the ground or the like with its projecting part that sticks out in the direction in which the leaning vehicle falls over. Therefore, the local impact on the projecting part when the vehicle falls over in the left direction or the right direction is high. This impact may sometimes reach the leaning frame structure of the vehicle body.

Even if the aforementioned impact is applied to the leaning frame structure made of a material containing fiber-reinforced resin, the leaning frame structure in some cases may not suffer significant deformation and breakage on the outer surface. In such cases, however, the inner part of the leaning frame structure may be partly damaged. Specifically, if the leaning frame structure is made of a material containing fiber-reinforced resin as described above, damage, such as a crack, may occur only in the inner part of the leaning frame structure. The damage that has occurred in the inner part of the leaning frame structure does not easily appear on the outer surface thereof. Therefore, it is difficult to identify the damage in the leaning frame structure in the visible range where a visual check of the outer surface of the leaning frame structure is conducted. Note that the damage includes chipping, cracking, denting, and splitting of the leaning frame structure.

As described above, when the leaning vehicle, which turns in a leaning posture, falls over, the leaning frame structure made of a material containing fiber-reinforced resin may be internally damaged.

Unlike four-wheeled vehicles, the leaning vehicle, which turns in a leaning posture, has a lot of parts projecting in the right and left directions on the vehicle body. Therefore, when the leaning vehicle falls over in the left direction or the right direction, the parts making first contact with the ground or the like vary in accordance with how the vehicle falls. In other words, it is difficult to locate the position making first contact with the ground or the like based on the falling condition when the leaning vehicle falls over in the left direction or the right direction.

To address this situation, the inventors have conceived a way to enhance the strength of the leaning frame structure to prevent the occurrence of internal damage of the leaning frame structure. However, as described above, it is difficult to locate the position making first contact with the ground or the like when the leaning vehicle falls over. In addition, the damage as described above may occur at the projecting parts that stick out in the right and left directions from the leaning frame structure, or at the parts other than the projecting parts of the leaning frame structure. Because of this, it is difficult to locate the position on the leaning frame structure that should be enhanced in strength. Therefore, the strength enhancement of the leaning frame structure involves increasing the rigidity of the entire leaning frame structure, or changing the material making up the leaning frame structure. These measures make it difficult to reduce the weight of the leaning vehicle.

During the proceedings of the study, the inventors found that the frequency with which the internal damage occurred in the leaning frame structure when the leaning vehicle had fallen over in the left direction or the right direction was not so high. Then, the inventors discovered that, if the frequency of occurrence of the internal damage of the leaning frame structure was not so high, the changes in ride quality of the leaning vehicle could be reduced by notifying the rider of the possibility of the internal damage in the leaning frame structure and urging the rider to check the leaning vehicle, replace the damaged parts, or take other measures, rather than enhancing the strength of the leaning frame structure.

Based on the above-described study results, the inventors have arrived at the following configurations.

The leaning vehicle according to an embodiment of the present teaching is a leaning vehicle that turns in a leaning posture. This leaning vehicle includes a leaning frame structure that, with respect to a left-right direction of the leaning vehicle, leans left during a left turn, leans right during a right turn, and is made of a material containing fiber-reinforced resin, and a leaning frame structure damage notification unit that, when the leaning frame structure receives an impact caused by a fall of the leaning vehicle in a left direction or a right direction, and the impact causes damage to a non-visible part of the leaning frame structure, makes a notification of the damage.

When the vehicle, which turns in a leaning posture, for example, falls over in the left direction or the right direction, an impact is applied to the leaning frame structure made of the material containing fiber-reinforced resin. If the impact has damaged a non-visible part (e.g., an inner part) of the leaning frame structure, the leaning frame structure damage notification unit can notify the rider or the like of the damage.

Making the leaning frame structure with the material containing fiber-reinforced resin can achieve weight reduction of the leaning vehicle, while the leaning frame structure damage notification unit that notifies the rider or the like of the damage that has occurred to a non-visible part of the leaning frame structure can help reduce changes in ride quality of the leaning vehicle.

In another aspect, the leaning vehicle of the present teaching preferably includes the following configuration. The leaning frame structure damage notification unit has a leaning frame structure damage detection unit that, when the damage is caused to the non-visible part of the leaning frame structure, electrically detects the damage.

When damage has occurred to a non-visible part of the leaning frame structure of the leaning vehicle, this configuration can achieve detection of the damage with high accuracy. Therefore, making the leaning frame structure with the material containing fiber-reinforced resin can achieve weight reduction of the leaning vehicle, while notification to the rider or the like of the damage that has occurred in the leaning frame structure can help reduce changes in ride quality of the leaning vehicle.

In still another aspect, the leaning vehicle of the present teaching preferably includes the following configuration. The leaning frame structure damage detection unit detects the damage that has been caused to the non-visible part between two points, which are located in the leaning frame structure and separated from each other in the front-rear direction as viewed in the left-right direction.

Thus, even if damage has occurred to a non-visible part between two points, which are located in the leaning frame structure and separated from each other in the front-rear direction, this configuration can achieve detection of the damage with high accuracy. Therefore, making the leaning frame structure with the material containing fiber-reinforced resin can achieve weight reduction of the leaning vehicle, while notification to the rider or the like of the damage that has occurred in the leaning frame structure can help reduce changes in ride quality of the leaning vehicle.

In still another aspect, the leaning vehicle of the present teaching preferably includes the following configuration. The leaning frame structure damage detection unit includes an electric wire that has a tensile strength lower than a tensile strength of resin in the fiber-reinforced resin, and is provided in the leaning frame structure, and a leaning frame structure damage detection control unit that detects a break in the electric wire between two points separated from each other in the front-rear direction in the leaning frame structure as viewed in the left-right direction.

This configuration can detect the damage that has occurred in the leaning frame structure by the break in the electric wire provided in the leaning frame structure. Thus, the damage that has occurred in the leaning frame structure can be accurately detected. Therefore, making the leaning frame structure with the material containing fiber-reinforced resin can achieve weight reduction of the leaning vehicle, while notification to the rider or the like of the damage that has occurred in the leaning frame structure can help reduce changes in ride quality of the leaning vehicle.

In still another aspect, the leaning vehicle of the present teaching preferably includes the following configuration. The leaning frame structure damage detection unit includes a fiber optic cable that has a tensile strength lower than a tensile strength of resin in the fiber-reinforced resin and is provided in the leaning frame structure, and a leaning frame structure damage detection control unit that detects a break in the fiber optic cable between two points separated from each other in the front-rear direction in the leaning frame structure as viewed in the left-right direction.

This configuration can detect the damage that has occurred in the leaning frame structure by the break in the fiber optic cable provided in the leaning frame structure. Thus, the damage that has occurred in the leaning frame structure can be accurately detected. Therefore, making the leaning frame structure with the material containing fiber-reinforced resin can achieve weight reduction of the leaning vehicle, while notification to the rider or the like of the damage that has occurred in the leaning frame structure can help reduce changes in ride quality of the leaning vehicle.

In still another aspect, the leaning vehicle of the present teaching preferably includes the following configuration. The leaning frame structure damage detection unit detects changes in vibration propagating between two points, which are located on the leaning frame structure and separated from each other in the front-rear direction as viewed in the left-right direction.

This configuration can detect the damage that has occurred in the leaning frame structure with the changes in vibration propagating through the leaning frame structure. Thus, the damage that has occurred in the leaning frame structure can be accurately detected. Therefore, making the leaning frame structure with the material containing fiber-reinforced resin can achieve weight reduction of the leaning vehicle, while notification to the rider or the like of the damage that has occurred in the leaning frame structure can help reduce changes in ride quality of the leaning vehicle.

In still another aspect, the leaning vehicle of the present teaching preferably includes the following configuration. The leaning frame structure damage notification unit includes a state changing portion that, when the leaning frame structure receives the impact that causes the damage to the non-visible part of the leaning frame structure, changes a state of the state changing portion into a predetermined state, and makes a notification of the damage that has been caused in the non-visible part based on the change to the predetermined state of the state changing portion.

According to the configuration, when the leaning frame structure receives an impact that damages the non-visible part, the leaning frame structure damage notification unit notifies the rider or the like of the damage with the state changing portion that has entered into the predetermined state. Thus, the damage that has occurred to the non-visible part of the leaning frame structure can be more reliably notified to the rider or the like. Therefore, making the leaning frame structure with the material containing fiber-reinforced resin can achieve weight reduction of the leaning vehicle, while notification to the rider or the like of the damage that has occurred in the leaning frame structure can help reduce changes in ride quality of the leaning vehicle.

In still another aspect, the leaning vehicle of the present teaching preferably includes the following configuration. The state changing portion is a layer that is provided in the leaning frame structure and is different in color from the fiber-reinforced resin.

When a non-visible part of the leaning frame structure, or, for example, an inner part of the leaning frame structure is damaged, this configuration changes the color of the damaged part into a different color from the other parts. Thus, the damage that has occurred to the non-visible part of the leaning frame structure can be notified of to the rider or the like. Therefore, making the leaning frame structure with the material containing fiber-reinforced resin can achieve weight reduction of the leaning vehicle, while notification to the rider or the like of the damage that has occurred in the leaning frame structure can help reduce changes in ride quality of the leaning vehicle.

In addition, the aforementioned configuration eliminates the need for other devices, such as an electric circuit and a detection apparatus. Therefore, notification of the damage that has occurred to the non-visible part of the leaning frame structure can be made to the rider or the like with a simple and low cost configuration.

In still another aspect, the leaning vehicle of the present teaching preferably includes the following configuration. The state changing portion is a layer that is provided in the leaning frame structure and changes its color with force applied to the non-visible part of the leaning frame structure.

When a non-visible part of the leaning frame structure, or, for example, an inner part of the leaning frame structure has applied thereto a force of a predetermined magnitude or greater, this configuration changes the color of the non-visible part or the inner part into a color different from the other part. Thus, notification of the damage that has occurred to the non-visible part of the leaning frame structure through the application of force can be made to the rider or the like. Therefore, making the leaning frame structure with the material containing fiber-reinforced resin can achieve weight reduction of the leaning vehicle, while notification to the rider or the like of the damage that has occurred in the leaning frame structure can help reduce changes in ride quality of the leaning vehicle.

In addition, the aforementioned configuration eliminates the need for other devices, such as an electric circuit and a detection apparatus. Therefore, notification of the damage that has occurred to the non-visible part of the leaning frame structure can be made to the rider or the like with a simple and low cost configuration.

In still another aspect, the leaning vehicle of the present teaching preferably includes the following configuration. The state changing portion is a painted portion that is formed on the leaning frame structure and emits light when the damage is caused to the non-visible part of the leaning frame structure.

When the non-visible part of the leaning frame structure is damaged, this configuration can more reliably notify the rider or the like of the damage in the non-visible part by the painted portion that emits light. Therefore, making the leaning frame structure with the material containing fiber-reinforced resin can achieve weight reduction of the leaning vehicle, while notification to the rider or the like of the damage that has occurred in the leaning frame structure can help reduce changes in ride quality of the leaning vehicle.

In addition, the aforementioned configuration eliminates the need for other devices, such as an electric circuit and a detection apparatus. Therefore, notification of the damage that has occurred to the non-visible part of the leaning frame structure can be made to the rider or the like with a simple and low cost configuration.

In still another aspect, the leaning vehicle of the present teaching preferably includes the following configuration. The leaning frame structure damage notification unit includes a detection unit that directly, indirectly, or electrically detects the impact that is received by the leaning frame structure and causes the damage to the non-visible part of the leaning frame structure.

In still another aspect, the leaning vehicle of the present teaching preferably includes the following configuration. The detection unit directly detects the impact that is received by the leaning frame structure and causes the damage to the non-visible part of the leaning frame structure.

In still another aspect, the leaning vehicle of the present teaching preferably includes the following configuration. The detection unit indirectly detects the impact that is received by the leaning frame structure and causes the damage to the non-visible part of the leaning frame structure.

Since the leaning frame structure damage notification unit includes the detection unit that directly, indirectly, or electrically detects the impact that damages the non-visible part of the leaning frame structure as described above, the leaning frame structure damage notification unit can detect the impact when the leaning frame structure receives the impact that damages the non-visible part. Thus, the leaning frame structure damage notification unit can more reliably notify the rider or the like of the damage that has occurred to the non-visible part of the leaning frame structure. Therefore, making the leaning frame structure with the material containing fiber-reinforced resin can achieve weight reduction of the leaning vehicle, while notification to the rider or the like of the damage that has occurred in the leaning frame structure can help reduce changes in ride quality of the leaning vehicle.

In still another aspect, the leaning vehicle of the present teaching preferably includes the following configuration. The fiber-reinforced resin is a carbon-fiber-reinforced resin made by reinforcing resin with carbon fibers.

This configuration can achieve weight reduction and strength enhancement of the vehicle. With this configuration, the above-described configurations work effectively.

When an impact is applied to the leaning frame structure made of the material containing carbon-fiber-reinforced resin when the vehicle falls over in the left direction or the right direction, there may be cases where the outer surface (a part in a visible range) of the leaning frame structure does not suffer deformation and breakage. In such cases, however, an inner part (a non-visible part) of the leaning frame structure may be partly damaged. Note that the damage includes chipping, cracking, denting, and splitting of the leaning frame structure. The visible range denotes a range visually perceptible by the rider or the like from the outside of the leaning vehicle. On the contrary, the non-visible range denotes the inner part of a component or a range visually imperceptible unless parts are detached.

Even if such internal damage has occurred, the above-described leaning frame damage notification unit can detect the damage in the leaning frame structure. Therefore, the leaning frame structure damage notification unit can notify the rider or the like of the damage that has occurred to the non-visible part of the leaning frame structure.

Therefore, making the leaning frame structure with the material containing carbon-fiber-reinforced resin can achieve weight reduction of the leaning vehicle, while notification to the rider or the like of the damage that has occurred in the leaning frame structure can help reduce changes in ride quality of the leaning vehicle.

The terminology used herein is for the purpose of describing particular embodiments only, and is not intended to be limiting of the present teaching.

As used herein, the term "and/or" includes any and all combinations of one or more of the associated listed items.

It will be further understood that the terms "including", "comprising", or "having" and variations thereof when used in this description, specify the presence of stated features, steps, elements, components, and/or their equivalents, but do not preclude the presence or addition of one or more other steps, operations, elements, components, and/or groups thereof.

As used herein, the terms "mounted", "connected", "coupled" and/or their equivalents are used broadly, and encompass both "direct and indirect" mounting, connecting, and coupling. Further, "connected" and "coupled" are not restricted to physical or mechanical connections or couplings, and can include direct or indirect connections or couplings.

Unless otherwise defined, all terms (including technical and scientific terms) used herein have the same meaning as commonly understood by one having ordinary skill in the art to which the present teaching belongs.

It will be further understood that terms, such as those defined in commonly used dictionaries, should be interpreted as having a meaning that is consistent with their meaning in the context of the relevant art and present disclosure, and will not be interpreted in an idealized or overly formal sense unless expressly so defined herein.

In describing the present teaching, it will be understood that a number of techniques and steps are disclosed. Each of these has individual benefit, and each can also be used in conjunction with one or more, or, in some cases, all of the other disclosed techniques.

Accordingly, for the sake of clarity, the description will refrain from repeating every possible combination of the individual steps in an unnecessary fashion. Nevertheless, the description and claims should be read with the understanding that such combinations are entirely within the scope of the present teaching.

Embodiments of the leaning vehicle according to the present teaching will be discussed herein.

In the following description, numerous specific examples are set forth in order to provide a thorough understanding of the present teaching. It will be evident, however, to one skilled in the art that the present teaching may be practiced without these specific examples.

The present disclosure is to be considered as an exemplification of the teaching, and is not intended to limit the teaching to the specific embodiments illustrated by the figures or description below.

[Leaning Vehicle]

In this description, the leaning vehicle denotes a vehicle that leans to the left during a left turn, and leans to the right during a right turn. The leaning vehicle includes, for example, a two-wheeled motorcycle, a three-wheeled motorcycle, or the like.

[Leaning Frame Structure]

In this description, the leaning frame structure denotes a structure that constitutes at least a part of a framework architecture (frame) of the leaning vehicle. The leaning frame structure includes, for example, a main frame, a rear frame (rear structure), or the like.

[Fiber-Reinforced Resin]

In this description, the fiber-reinforced resin denotes a material containing resin reinforced with fibers. In this meaning, the fiber-reinforced resin is made of the material containing resin reinforced with fibers, but may have some parts made of resin only.

Advantageous Effects of Invention

An embodiment of the present teaching can provide configurations capable of achieving weight reduction, while helping reduce changes in ride quality, to a leaning vehicle that turns in a leaning posture, and has a leaning frame structure made of a material containing fiber-reinforced resin.

BRIEF DESCRIPTION OF THE DRAWINGS

FIG. 18 schematically illustrates a configuration of a leaning frame structure damage notification unit and a vehicle.

DETAILED DESCRIPTION

Figure 1:
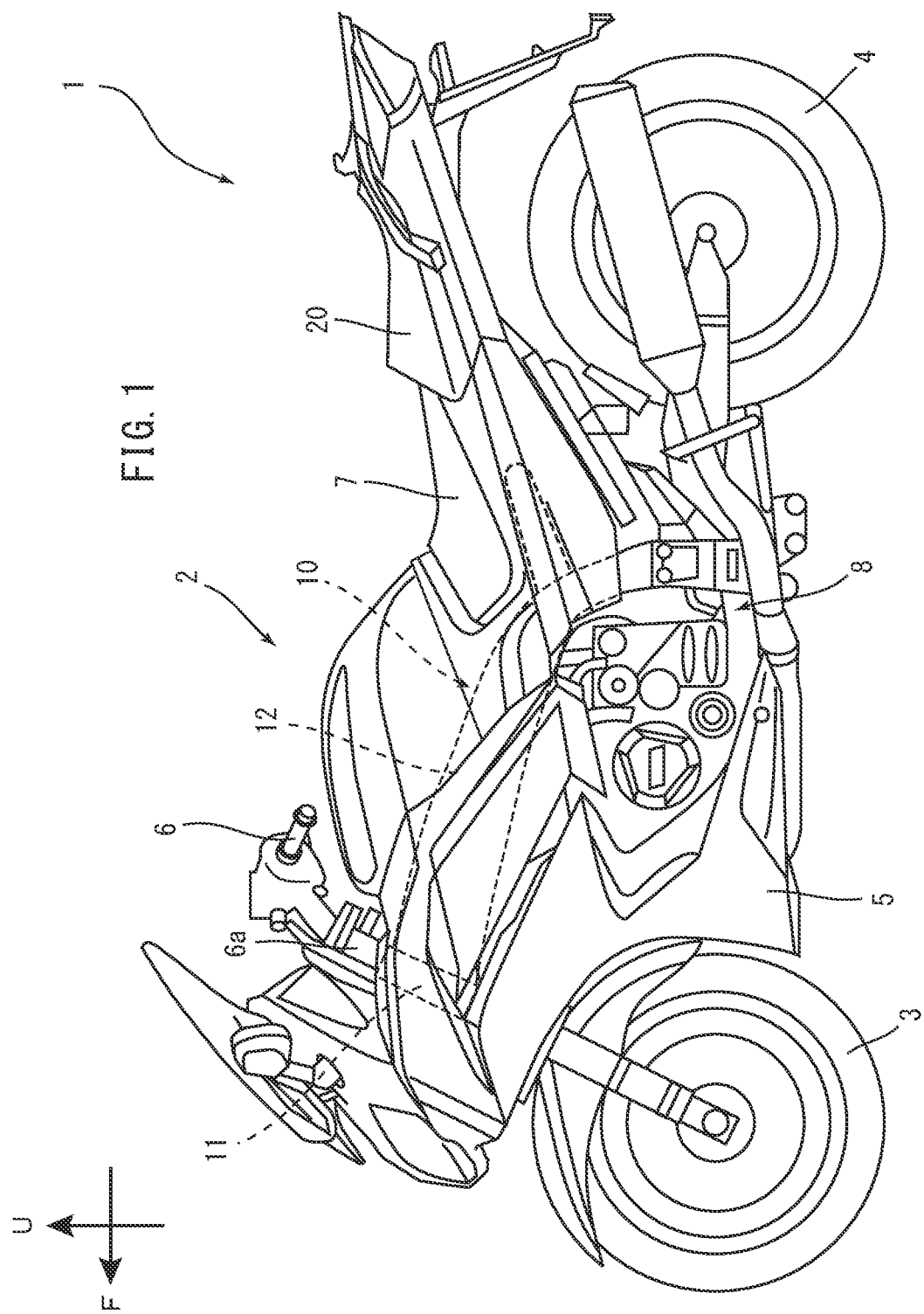
FIG. 1 is a left side view of a vehicle according to the first embodiment of the present teaching.

With reference to the drawings, embodiments of the present teaching will be described below. Like components are denoted by like reference symbols or reference numerals throughout the drawings, and the description thereof will not be reiterated. The dimensions of the components in the drawings do not exactly represent the dimensions and dimensional ratios of the actual components.

Hereinafter, Arrow F in the drawings indicates the front direction of the vehicle. Arrow U in the drawings indicates the upper direction of the vehicle. Arrow R in the drawings indicates the right direction of the vehicle. Arrow L in the drawings indicates the left direction of the vehicle. In addition, the front-rear and left-right directions denote the front-rear and left-right directions, respectively, as viewed by a rider driving the vehicle.

First Embodiment

<Overall Construction>

FIG. 1 is a side view schematically showing an overall configuration of a vehicle 1 (leaning vehicle) according to the first embodiment. The vehicle 1 is, for example, a two-wheeled motorcycle, and includes a vehicle body 2, a front wheel 3, and a rear wheel 4. The vehicle 1 is a leaning vehicle that turns in a leaning posture. Specifically, the vehicle 1 leans to the left during a left turn and leans to the right during a right turn.

The vehicle body 2 supports various components, such as a body cover 5, handlebars 6, a seat 7, and a power unit 8. In this embodiment, the vehicle body 2 includes a frame 10, and a rear structure 20. In short, the vehicle body 2 is a structure including the frame 10 and the rear structure 20 (leaning frame structure), and supporting the various components of the vehicle 1. Note that the leaning frame structure is a structure functioning as a framework of the vehicle 1, and therefore includes not only bar-like frame members, but also monocoque structure members.

The frame 10 includes a head pipe 11 and a main frame 12. The head pipe 11 is located on the front side of the vehicle 1, and rotatably supports a steering shaft 6a connected to the handlebars 6. The main frame 12 is connected to the head pipe 11 so as to extend from the head pipe 11 toward the rear of the vehicle. The main frame 12 supports the power unit 8 and some other components. The frame 10 is covered with the body cover 5.

The frame 10 may be made of a metal material, or fiber-reinforced resin reinforced with fibers, such as carbon fibers. Also, the frame 10 can be made of any materials capable of functioning as a frame of the vehicle 1.

The rear structure 20 has a so-called monocoque structure in which the load of the components supported by the rear structure 20 and the force applied to the rear structure 20 are borne by a wall portion 20a (see FIG. 3) of the rear structure 20. The rear structure 20 makes up a part of the outer surface of the vehicle body 2. In short, the rear structure 20 has a function as a structure member bearing the load and force, and a function as a cover member making up a part of the outer surface of the vehicle body 2.

Figure 2:
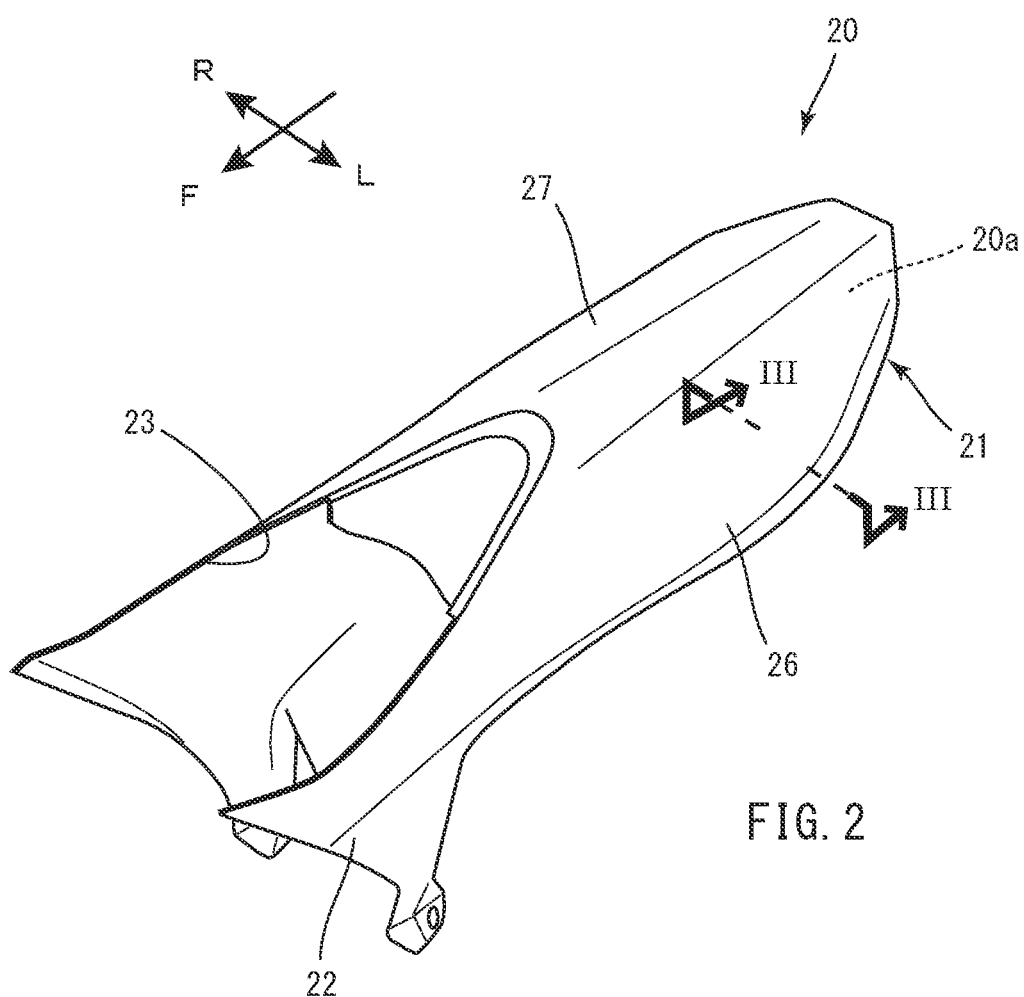
FIG. 2 is a perspective view showing a schematic configuration of a rear structure.

FIG. 2 is a perspective view showing a schematic configuration of the rear structure 20. In this embodiment, the rear structure 20 functions not only as a rear frame of the vehicle 1, but also as a rear cover of the vehicle 1. Note that the rear structure 20 shown in FIG. 2 is an example of a rear structure that supports the seat 7 and some other components. The rear structure can be configured in a different manner from that shown in FIG. 2.

The rear structure 20 is made of a material containing carbon-fiber-reinforced resin made by reinforcing resin (e.g., epoxy resin, vinyl ester, phenolic resin, polyamide, polypropylene, polyphenylene sulfide, etc.) with carbon fibers. The carbon fibers may be woven or non-woven. In addition, the carbon fibers may be continuous fibers having a predetermined length (e.g., 1 mm) or longer, or discontinuous fibers. Both the continuous fibers and discontinuous fibers can be also used as the carbon fibers.

The rear structure 20 is long in the front-rear direction of the vehicle. The rear structure 20 has a rear part and a front part with respect to the center thereof in the front-rear direction of the vehicle 1, and the dimension of the rear part in the left-right direction of the vehicle 1 is greater than the dimension of the front part in the left-right direction. Specifically, when the vehicle 1 is viewed from above, parts on the rear side of the rear structure 20 with respect to the center thereof in the front-rear direction of the vehicle 1 project the most in the left-right direction of the rear structure 20. Regarding the rear structure 20, the most projecting part in the left direction of the vehicle 1 is a left projecting portion 26, while the most projecting part in the right direction of the vehicle 1 is a right projecting portion 27.

In more detail, the rear structure 20 has a main body 21 and connecting portions 22. When the main body 21 is viewed from its cross section taken by cutting the main body 21 in the left-right direction of the vehicle 1 (hereinafter, the cross-section is simply referred to as a cross-section in the left-right direction of the vehicle 1), the main body 21 has a closed cross-section enclosed by the wall portion 20a. As shown in FIG. 2, the main body 21 has a cut-away portion 23, in which the seat 7 is placed, at a front part thereof in the front-rear direction of the vehicle 1.

The connecting portions 22 extend from the main body 21 in the downward direction of the vehicle 1. The connecting portions 22 are provided in a pair at lower parts of the main body 21, and are opposed to each other. The connecting portions 22 are integrally molded with the main body 21. The connecting portions 22 are connected to the frame 10.

As shown in FIG. 2, the main body 21 has the left projecting portion 26 and the right projecting portion 27. The left projecting portion 26 is situated on the left side of the main body 21 in the left-right direction of the vehicle 1. In other words, the left projecting portion 26 of the rear structure 20 projects to the left of the vehicle 1. The right projecting portion 27 is situated on the right side of the main body 21 in the left-right direction of the vehicle 1. In other words, the right projecting portion 27 of the rear structure 20 projects to the right of the vehicle 1.

<Leaning Frame Structure Damage Notification Unit>

As described above, the vehicle 1 leans to the left during a left turn and leans to the right during a right turn. If the vehicle 1 is not supported during a stop, the vehicle 1 falls over in the left direction or the right direction.

Unlike four-wheeled vehicles, the vehicle 1, which is a leaning vehicle that turns in a leaning posture, has a lot of parts projecting in the right and left directions on the vehicle body 2. Consequently, the vehicle body 2 has many projections and depressions in the left and right directions. Therefore, when the vehicle 1 falls over in the left direction or the right direction, the parts making first contact with the ground or the like vary in accordance with the falling conditions.

The vehicle 1 that falls over in the left direction or the right direction touches the ground or the like with its projecting part, of the vehicle body 2, that sticks out in the direction in which the vehicle 1 falls over. Therefore, the local impact on the projecting part when the vehicle 1 falls over in the left direction or the right direction is high.

In this embodiment, the left projecting portion 26 and the right projecting portion 27 of the rear structure 20 project in the left direction and the right direction, respectively, and therefore the left projecting portion 26 or the right projecting portion 27 makes contact with the ground or the like when the vehicle 1 falls over in the left direction or the right direction. The impact caused by the contact may be sometimes directly applied to the rear structure 20.

As described above, the rear structure 20 is made of a material containing carbon-fiber-reinforced resin made by reinforcing resin with carbon fibers. When the aforementioned impact is applied to the rear structure 20 made of the material containing carbon-fiber-reinforced resin, cases may exist where the outer surface (a part in a visible range) of the rear structure 20 does not suffer deformation and breakage. In such cases, however, an inner part (a non-visible part) of the rear structure 20 may be partly damaged. Note that the aforementioned damage includes chipping, cracking, denting, and splitting of the rear structure 20. The visible range denotes a range visually perceptible by a rider or the like from the outside of the vehicle 1. On the contrary, the non-visible range denotes the inner part of the member or a range visually imperceptible unless parts are detached.

In this embodiment, the vehicle 1 includes a leaning frame structure damage notification unit 40 that detects damage in an inner part of the rear structure 20, and makes a notification of the damage. The leaning frame structure damage notification unit 40 includes a leaning frame structure damage detection unit 45 and an output unit 43. The leaning frame structure damage detection unit 45 includes a detection wire 41 (state changing portion), a broken-wire detection unit 42 (leaning frame structure damage detection control unit), and detection terminals 41a, 41b located at the opposite ends of the detection wire 41.

Figure 5:
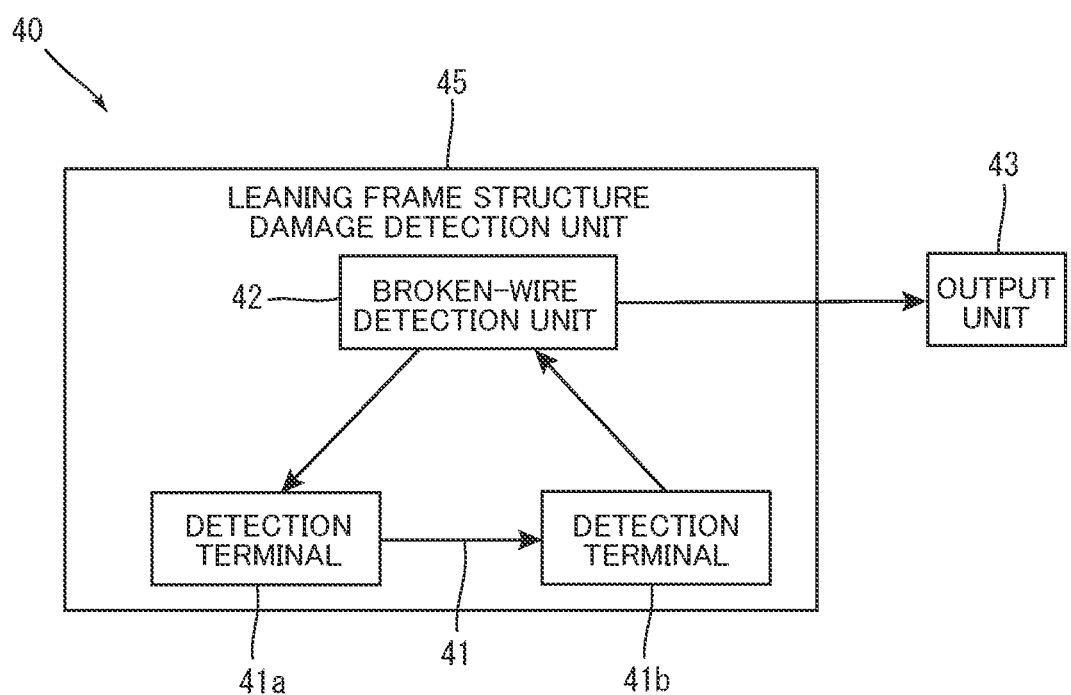
FIG. 5 is a functional block diagram showing the configuration of the leaning frame structure damage notification unit.

The leaning frame structure damage notification unit 40 detects a break in the detection wire 41 by allowing the broken-wire detection unit 42 of the leaning frame structure damage detection unit 45 to detect a signal between the detection terminals 41a and 41b, and notifies the rider or the like of the detection result through the output unit 43. FIG. 5 is a functional block diagram of the leaning frame structure damage notification unit 40. FIG. 18 illustrates a schematic configuration of the leaning frame structure damage notification unit 40 and the vehicle 1.

Figure 3:
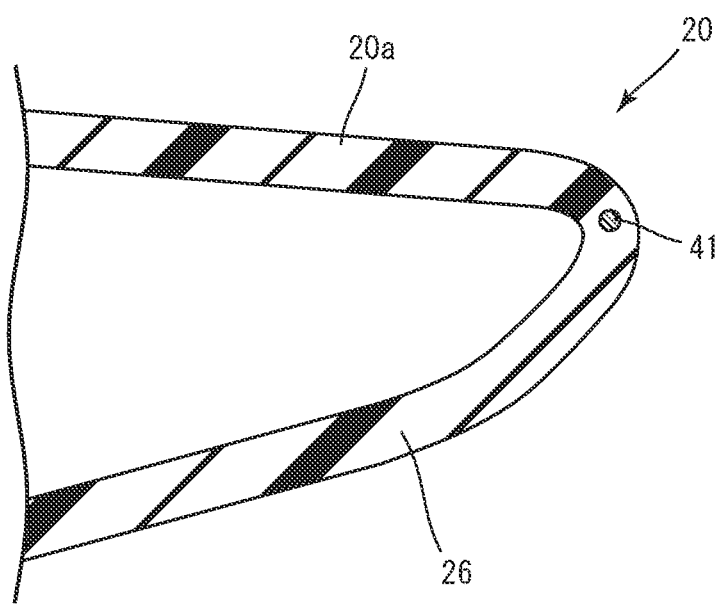
FIG. 3 is a cross-sectional view taken along Line III-III in FIG. 2.
Figure 4:
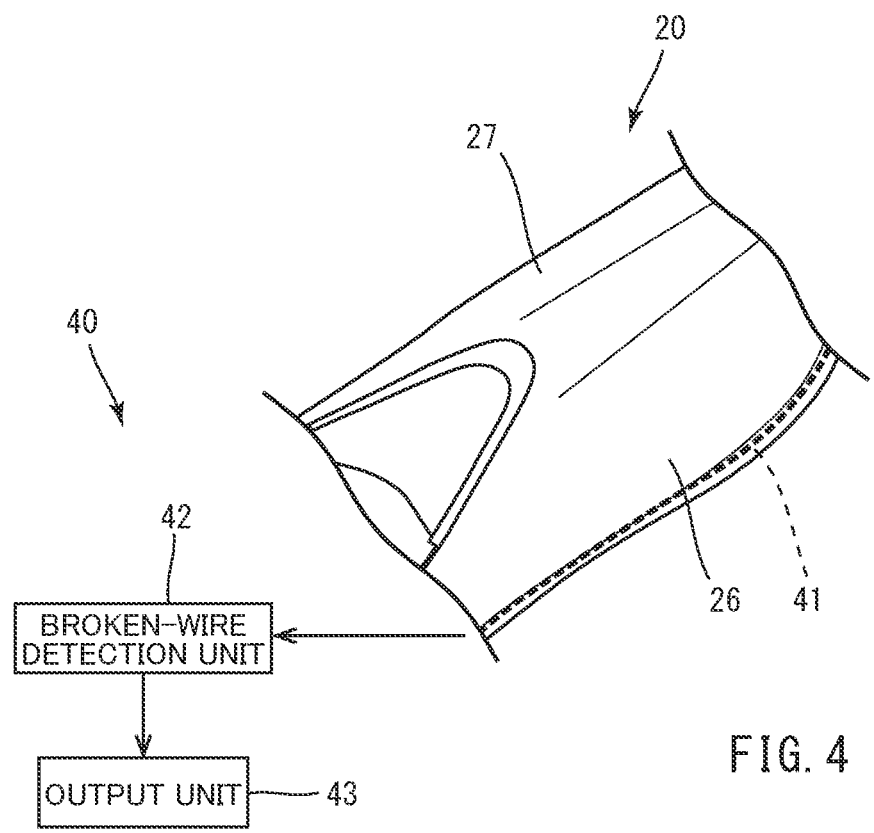
FIG. 4 schematically illustrates a configuration of a leaning frame structure damage notification unit.

Specifically, a detection wire 41 is routed in an inner part of a wall portion making up the left projecting portion 26 of the rear structure 20, and a detection wire 41 is routed in an inner part of a wall portion making up the right projecting portion 27. FIGS. 3 and 4 show configuration examples in which a detection wire 41 is placed in the inner part of a wall portion 20a making up the left projecting portion 26. The detection wires 41 are routed in the left projecting portion 26 and the right projecting portion 27 of the rear structure 20, respectively, along the front-rear direction of the vehicle 1. In other words, the detection wires 41 are placed so as to extend through the rear structure 20 in the front-rear direction of the vehicle 1. In this placement of the detection wires 41, a detection terminal 41a placed at one end of the detection wire 41 and a detection terminal 41b placed at the other end of the detection wire 41 are separated from each other in the rear structure 20 in the front-rear direction of the vehicle 1 as viewed in the left-right direction.

However, the detection terminals 41a, 41b do not need to be placed in the rear structure 20 separately in the front-rear direction of the vehicle 1 as viewed in the left-right direction. Specifically speaking, if the detection wire 41 is a closed loop wire as will be described later, the detection terminals 41a, 41b may be placed on the same position in the front-rear direction of the vehicle 1 as viewed in the left-right direction. The detection terminals 41a, 41b may be placed in the rear structure 20 wherever they can detect damage of the rear structure 20.

The detection wire 41 is formed in a closed loop such that predetermined signals flow between the detection terminals 41a and 41b. The detection wire 41 may be separate closed loops each placed in the left projecting portion 26 and the right projecting portion 27 of the rear structure 20, or may be a closed loop placed across the left projecting portion 26 and the right projecting portion 27. The detection wire 41 is electrically connected to the broken-wire detection unit 42 through the detection terminals 41a, 41b.

The predetermined signals are used by the broken-wire detection unit 42 to detect the presence or absence of a break in the detection wire 41, which will be described later. The predetermined signals may be electrical signals that are exclusively used to detect the presence or absence of a break in the detection wire 41, or electrical signals that are used for other applications.

The detection wire 41 has a tensile strength lower than that of the carbon-fiber-reinforced resin making up the rear structure 20, and breaks when the inner part of the rear structure 20 is damaged by an impact. The detection wire 41 may be anything, such as a metal electric wire and an optical fiber, that is capable of transmitting the predetermined signals.

Such a detection wire 41 breaks when the inner part of the rear structure 20 is damaged by an impact caused by a fall of the vehicle 1 in the left direction or the right direction. As a result, the predetermined signal that is supposed to be flowing through the detection wire 41 between the detection terminals 41a and 41b does not flow through the detection wire 41.

The broken-wire detection unit 42 outputs the predetermined signals to the detection terminal 41a situated at one end of the detection wire 41, and detects the predetermined signals flowing in the detection terminal 41b situated at the other end of the detection wire 41. When the broken-wire detection unit 42 does not detect the predetermined signals from the detection terminal 41b even after it has output the predetermined signals to the detection terminal 41a, the broken-wire detection unit 42 generates a damage detection signal and outputs the signal. Thus, the broken-wire detection unit 42 detects a break in the detection wire 41 between two points (detection terminals 41a, 41b) in the rear structure 20.

The broken-wire detection unit 42 may be implemented by a dedicated control device or provided in other control devices, such as a controller for controlling the power unit 8 or other components in the vehicle 1.

The output unit 43 makes a notification to the rider or the like when receiving the damage detection signal output from the broken-wire detection unit 42. Specifically, when the broken-wire detection unit 42 detects that the predetermined signals are not flowing in the detection wire 41, the output unit 43 makes a notification to the rider or the like. The output unit 43 may be, for example, a lamp or a display screen provided on a display unit to indicate a meter or the like, or a display device or the like provided on the periphery of the handlebars 6. Alternatively, the output unit 43 may be configured to make a notification of the damage detection signal by means of a sound, vibrations or the like. The output unit 43 may be implemented by a dedicated device that makes a notification of the damage detection signal, or by adding a notification function to a device having other functions.

When the vehicle 1, which is equipped with the leaning frame structure damage notification unit 40 configured as described above, falls over in the left direction or the right direction during a stop and receives an impact, the impact breaks the detection wire 41 in the inner part of the rear structure 20. The detection wire 41 breaks even when only the inner part of the rear structure 20 is damaged, but the surface thereof is not.

When the detection wire 41 breaks as described above, the predetermined signal output from the broken-wire detection unit 42 to the detection wire 41 is not detected by the broken-wire detection unit 42. Then, the broken-wire detection unit 42 generates a damage detection signal and outputs it. This damage detection signal is input to the output unit 43 that, in turn, notifies the rider or the like of the possibility of damage in the inner part of the rear structure 20.

The above-described configurations enable notification of damage that has occurred to the non-visible inner part of the rear structure 20, but has not occurred in the part in the visible range on the surface.

As described above, the vehicle 1 of the present embodiment includes a rear structure 20 that leans to the left during a left turn, leans to the right during a right turn with respect to the left-right direction, and is made of a material containing carbon-fiber-reinforced resin, and a leaning frame structure damage notification unit 40 that, when the rear structure 20 receives an impact caused by a fall of the vehicle 1 in the left direction or the right direction, and the impact damages a non-visible part of the rear structure 20 without damaging a part in the visible range, makes a notification of the damage.

When, for example, the vehicle 1, which turns in a leaning posture, falls over in the left direction or the right direction, and an impact is applied to the rear structure 20 made of the material containing carbon-fiber-reinforced resin and damages a non-visible part of the rear structure 20 without damaging a part in the visible range, the rider or the like can be notified of the damage by the leaning frame structure damage notification unit 40. This configuration allows the rider to know the damage that has occurred to the non-visible part (e.g., an inner part) of the rear structure 20 through the leaning frame structure damage notification unit 40 even though the damage is not recognizable in the visible range on the rear structure 20.

Therefore, the vehicle 1 with the rear structure 20 made of a material containing carbon-fiber-reinforced resin can achieve weight reduction and can help reduce changes in ride quality.

The leaning frame structure damage notification unit 40 includes the detection wire 41 (state changing portion) that breaks (changes itself into a predetermined state) when the rear structure 20 receives an impact that damages a non-visible part without damaging a part in the visible range. The leaning frame structure damage notification unit 40 makes a notification of the damage that has occurred to the non-visible part based on the break (predetermined state change) of the detection wire 41.

According to the configuration, when the rear structure 20 receives an impact that damages the non-visible part, but does not damage the part in the visible range, the leaning frame structure damage notification unit 40 notifies the rider or the like of the damage based on the break (predetermined state change) that has occurred in the detection wire 41 (state changing portion). In short, the leaning frame structure damage notification unit 40 makes a notification of the damage that has occurred to the non-visible part of the rear structure 20 based on the break (predetermined state change) of the detection wire 41. Therefore, notification of the damage that has occurred to the non-visible part of the rear structure 20 can be more reliably made to the rider or the like.

The detection wire 41 is a wire having a tensile strength lower than that of the resin in the carbon-fiber-reinforced resin. The leaning frame structure damage notification unit 40 includes the broken-wire detection unit 42 that electrically detects a break in the wire, and the output unit 43 that, when the broken-wire detection unit 42 detects the break in the wire, makes a notification of the damage that has occurred to the non-visible part.

Such a detection wire 41 breaks before the impact received by the rear structure 20 made of a material containing carbon-fiber-reinforced resin damages the resin in the carbon-fiber-reinforced resin. The leaning frame structure damage notification unit 40 electrically detects a break in the detection wire 41 through the broken-wire detection unit 42, and notifies the rider or the like of the detection result through the output unit 43. Therefore, when the rear structure 20 receives an impact that damages the non-visible part, the rider or the like can be more reliably notified of the damage.

The leaning frame structure damage notification unit 40 electrically detects an impact that is received by the rear structure 20 and damages a non-visible part without damaging a part in the visible range.

Thus, when an impact that damages a non-visible part without damaging a part in the visible range has been applied to the rear structure 20, the leaning frame structure damage notification unit 40 can detect the impact. Therefore, the rider or the like can be notified of the damage that has occurred to the non-visible part of the rear structure 20 by the leaning frame structure damage notification unit 40.

Second Embodiment

Figure 6:
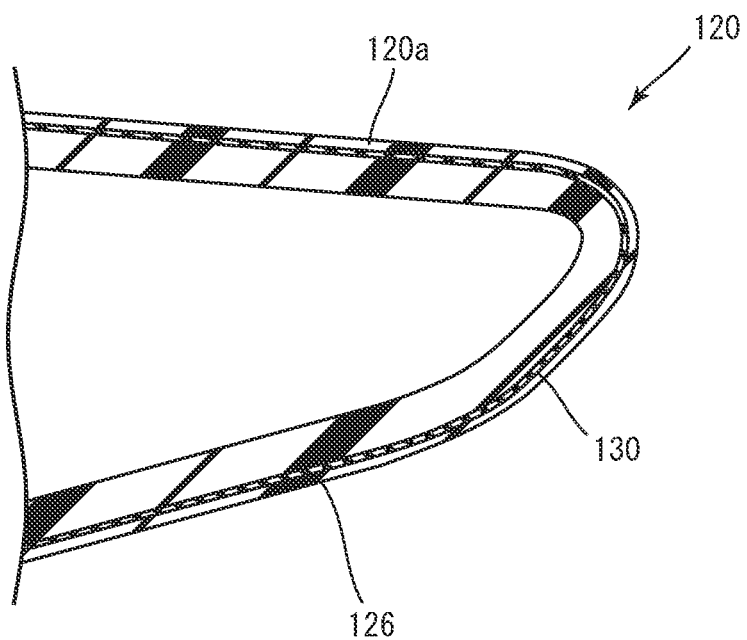
FIG. 6 illustrates a vehicle according to the second embodiment, and is equivalent to FIG. 3.

FIG. 6 is a cross-sectional view of a partially-enlarged rear structure 120 of a vehicle according to the second embodiment. This embodiment is different from the first embodiment in that a damage notification layer 130 (leaning frame structure damage notification unit) is provided in a wall portion 120a of a rear structure 120 instead of the leaning frame structure damage notification unit 40 in the first embodiment. In the following, like components are denoted by like numerals or symbols as those in the first embodiment and will not be reiterated, and only the components different from the first embodiment will be described.

As shown in FIG. 6, the damage notification layer 130 (state changing portion) is provided in the wall portion 120a of a left projecting portion 126 of the rear structure 120. The damage notification layer 130 is a resin layer that is different in color from the carbon-fiber-reinforced resin. Thus, the damage notification layer 130 in the wall portion 120a is covered with carbon-fiber-reinforced resin on both sides in the direction of the thickness. The damage notification layer 130 in the wall portion 120a is located closer to the outer surface of the wall portion 120a than the inner surface.

The resin layer making up the damage notification layer 130 may be the same kinds of resin as the carbon-fiber-reinforced resin, or may be different kinds of resin from the carbon-fiber-reinforced resin.

Although it is not particularly illustrated, the damage notification layer 130 is also provided in the wall portion of a right projecting portion of the rear structure 120.

In general, it sometimes appears that the carbon-fiber-reinforced resin with no force applied is not damaged even though it is actually damaged by receiving an impact.

On the other hand, the damage notification layer 130, which is different in color from the carbon-fiber-reinforced resin, is provided in the wall portion 120a of the rear structure 120 made of a material containing carbon-fiber-reinforced resin, and when the carbon-fiber-reinforced resin covering the damage notification layer 130 is damaged, the damage notification layer 130 is partially exposed. This exposure can explicitly show the rider or the like that the wall portion 120a of the rear structure 120 has been damaged. In this embodiment, the partial exposure of the damage notification layer 130 corresponds to the predetermined change of the state changing portion.

The damage notification layer 130 in this embodiment is a layer that is provided in the rear structure 120 and is different in color from the carbon-fiber-reinforced resin.

When a non-visible part of the rear structure 120, or, for example, an inner part of the rear structure 120 is damaged, the damaged part changes its color into a different color from the other part. Thus, the rider or the like can be notified of the damage that has occurred to the non-visible part of the rear structure 120.

The damage notification layer 130 may contain a material whose color is changeable with application of force, for example, a mechanoluminescent material, an opal coating film, and microcapsules each filled with paint. Specifically, the damage notification layer 130 is a layer that is formed on the rear structure 120 and changes its color when a force of a predetermined magnitude or greater is applied to a non-visible part. The force of a predetermined magnitude or greater is force that damages an inner part of the wall portion 120a of the rear structure 120 with an impact received by the vehicle 1 that falls over in the left direction or the right direction during a stop.

Thus, if a force of a predetermined magnitude or greater is applied to a non-visible part of the rear structure 120, or, for example, an inner part of the rear structure 120, the part changes its color into a different color from the other part. Therefore, the rider or the like can be notified of the damage caused by application of force to the non-visible part of the rear structure 120.

In addition, the aforementioned configuration eliminates the need for other devices, such as an electric circuit and a detection apparatus. Therefore, notification of the damage that has occurred to the non-visible part of the rear structure 120 can be made to the rider or the like with a simple and low cost configuration.

Third Embodiment

Figure 7:
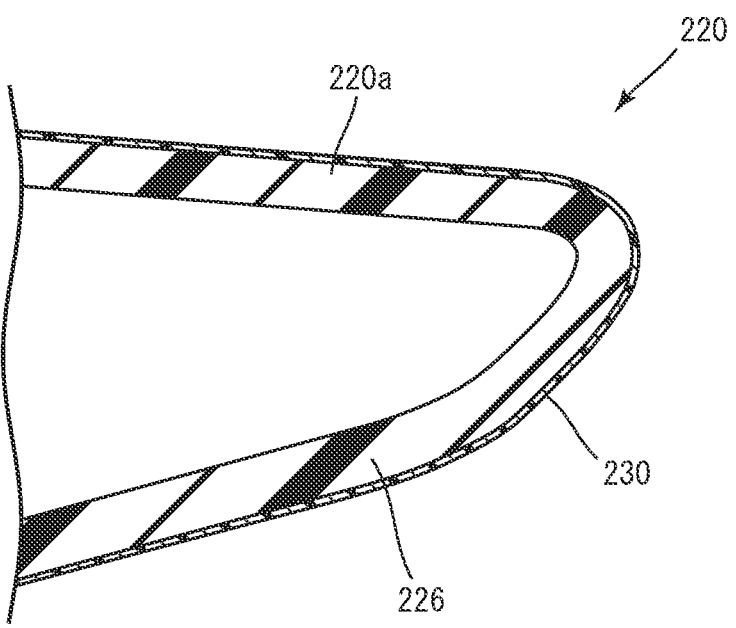
FIG. 7 illustrates a vehicle according to the third embodiment, and is equivalent to FIG. 3.

FIG. 7 is a cross-sectional view of a partially-enlarged rear structure 220 of a vehicle according to the third embodiment. This embodiment is different in configuration from the second embodiment in that a damage notification layer 230 (leaning frame structure damage notification unit) is provided on the surface of a wall portion 220a of the rear structure 220. In the following, like components are denoted by like numerals or symbols as those in the second embodiment and will not be reiterated, and only the components different from the second embodiment will be described.

As shown in FIG. 7, the damage notification layer 230 (state changing portion, painted portion) is provided on the outer surface of the wall portion 220a of a left projecting portion 226 of the rear structure 220. The damage notification layer 230 contains a luminescent material that emits light with application of force, for example, a mechanoluminescent material, an opal coating film, and microcapsules each filled with paint.

The above-described damage notification layer 230 emits light when the vehicle 1 falls over in the left direction or the right direction during a stop and the left projecting portion 226 of the rear structure 220 receives a force of a predetermined magnitude or greater. The force of a predetermined magnitude or greater is an impact that is received by the vehicle 1 upon a fall in the left direction or the right direction during a stop, and damages an inner part of the wall portion 220a of the rear structure 220.

Although it is not particularly illustrated, the damage notification layer 230 is also provided on the outer surface of a right projecting portion of the rear structure 220.

Thus, when the vehicle 1 falls over in the left direction or the right direction during a stop, and a force of a predetermined magnitude or greater acts on the damage notification layer 230 so as to damage an inner part (a non-visible part) of the wall portion 220a of the rear structure 220, the damage notification layer 230 notifies the rider or the like of the damage by emitting light (a predetermined state change of the state changing portion).

In this embodiment, the damage notification layer 230 is a painted portion that is formed on the rear structure 220 and emits light when a non-visible part is damaged.

Therefore, when a non-visible part of the rear structure 220 is damaged, the damage notification layer 230 emits light to reliably notify the rider or the like of the damage that has occurred to the non-visible part.

In addition, the aforementioned configuration eliminates the need for other devices, such as an electric circuit and a detection apparatus, as with the configuration of the second embodiment. Therefore, notification of the damage that has occurred to the non-visible part of the rear structure 220 can be made to the rider or the like with a simple and low cost configuration.

Fourth Embodiment

Figure 8:
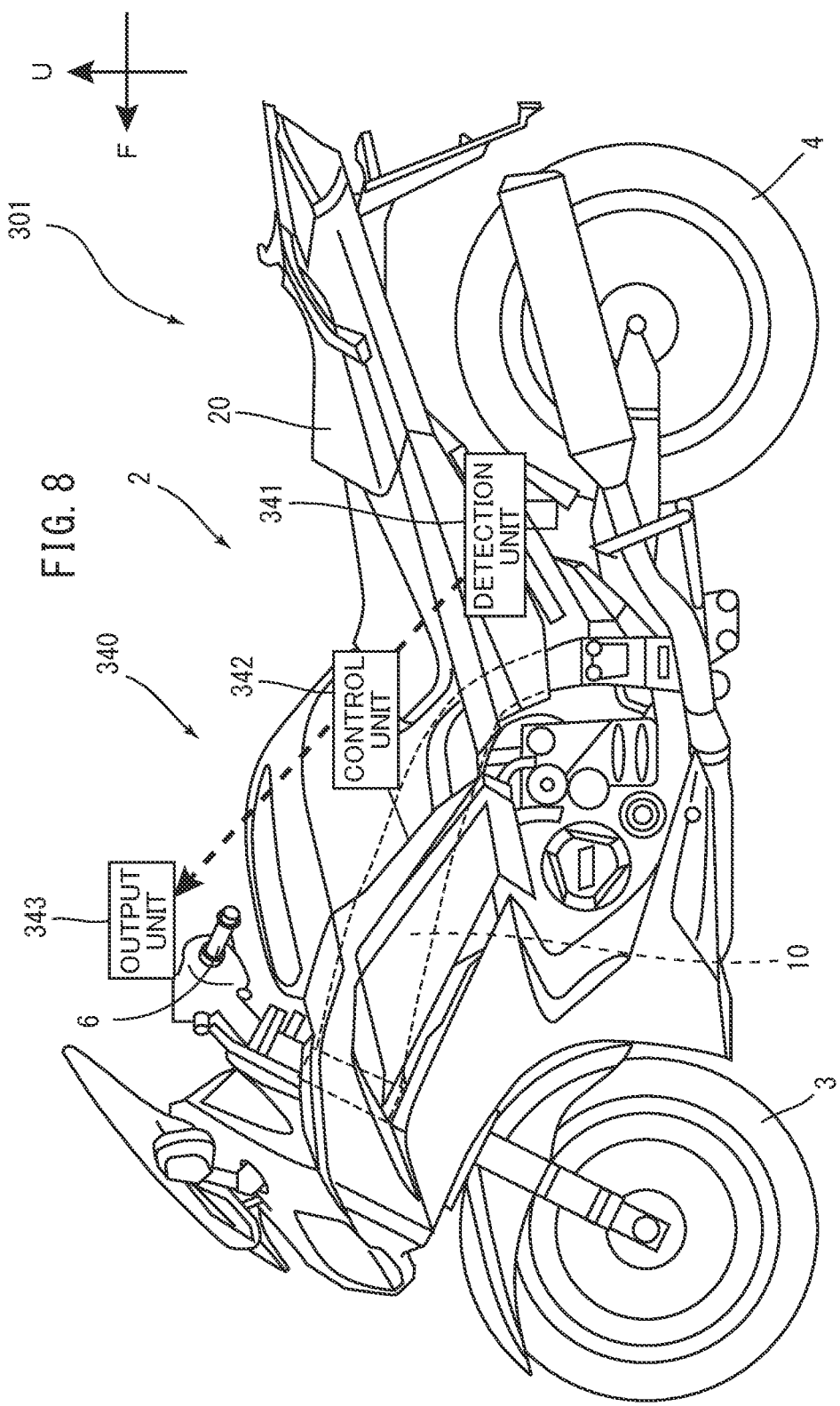
FIG. 8 illustrates a vehicle according to the fourth embodiment, and is equivalent to FIG. 1.

FIG. 8 is a side view of a vehicle 301 according to the fourth embodiment. This embodiment is different in configuration from the first embodiment in that a vehicle 301 includes a leaning frame structure damage notification unit 340 that detects an impact received by a rear structure 20 and makes a notification, instead of the leaning frame structure damage notification unit 40 in the first embodiment. In the following, like components are denoted by like numerals or symbols as those in the first embodiment and will not be reiterated, and only the components different from the first embodiment will be described.

The leaning frame structure damage notification unit 340 includes a detection unit 341, a control unit 342, and an output unit 343. The detection unit 341 detects an impact received by the rear structure 20. When an impact that damages an inner part (a non-visible part) is applied to the rear structure 20, the detection unit 341 outputs a detection signal.

The detection unit 341 includes, for example, a force sensor, a sound sensor, a position detection sensor, or an acceleration sensor. The detection unit 341 may include any other types of sensor capable of detecting an impact received by the rear structure 20, except for the aforementioned force sensor, the sound sensor, the position detection sensor, and the acceleration sensor.

In the case where the detection unit 341 is a force sensor, the detection unit 341 detects a force applied to the rear structure 20. Such a force sensor serving as the detection unit 341 is preferably placed at a position on the rear structure 20 where the greatest force is exerted when the vehicle 1 falls over during a stop.

In the case where the detection unit 341 is a sound sensor, the detection unit 341 detects a sound caused by the impact applied to the rear structure 20 (a sound derived from the impact, e.g., a sound of collision, and a sound generated in association with deformation of the rear structure 20). Such a sound sensor serving as the detection unit 341 is preferably placed at a position where the generated sound can be most effectively detected.

In the case where the detection unit 341 is a position detection sensor, the detection unit 341 detects a displacement of the rear structure 20 caused by an impact exerted on the rear structure 20. Such a position detection sensor serving as the detection unit 341 is preferably placed at a position where the rear structure 20 is most displaced.

In the case where the detection unit 341 is an acceleration sensor, the detection unit 341 detects an acceleration of the rear structure 20 caused by an impact exerted on the rear structure 20. Such an acceleration sensor serving as the detection unit 341 is preferably placed at a position where the greatest acceleration is generated in the rear structure 20 when the impact is exerted on the rear structure 20.

As described above, the detection unit 341, which is implemented by various types of sensors, detects the impact received by the rear structure 20, and outputs it in the form of an electrical signal. That is, when the rear structure 20 receives an impact that damages a non-visible part, the detection unit 341 can electrically detect the impact and output it.

The detection unit 341 may be provided to each of the left projecting portion 26 and the right projecting portion 27 such that those detection units 341 can individually detect the impact exerted on the left projecting portion 26 and the right projecting portion 27, or the detection unit 341 may be provided such that the single detection unit 341 can detect the impact exerted on the left projecting portion 26 and the right projecting portion 27.

The control unit 342 generates a notification signal based on the detection signal output from the detection unit 341, and outputs the notification signal. Specifically, when the detection unit 341 detects that an impact that damages an inner part has been applied to the rear structure 20, the control unit 342 generates and outputs the notification signal. This notification signal is input to the output unit 343.

The output unit 343 makes a notification to the rider or the like when the control unit 342 outputs the notification signal. Specifically, when the detection unit 341 detects that an impact that damages an inner part of the rear structure 20 has been applied to the rear structure 20, the output unit 343 notifies the rider or the like that the rear structure 20 has been damaged.

Therefore, when the vehicle 301 falls over in the left direction or the right direction during a stop, and an impact that damages the inner part is applied to the rear structure 20, the rider or the like can be notified of the damage.

In this embodiment, the detection unit 341 directly detects the impact that is received by the rear structure 20 and damages a non-visible part without damaging a part in the visible range.

Through the direct detection, when an impact that damages a non-visible part without damaging a part in the visible range is applied to the rear structure 20, the leaning frame structure damage notification unit 340 can reliably detect the impact. Therefore, the leaning frame structure damage notification unit 340 can more reliably notify the rider or the like of the damage that has occurred to the non-visible part of the rear structure 20.

Fifth Embodiment

Figure 9:
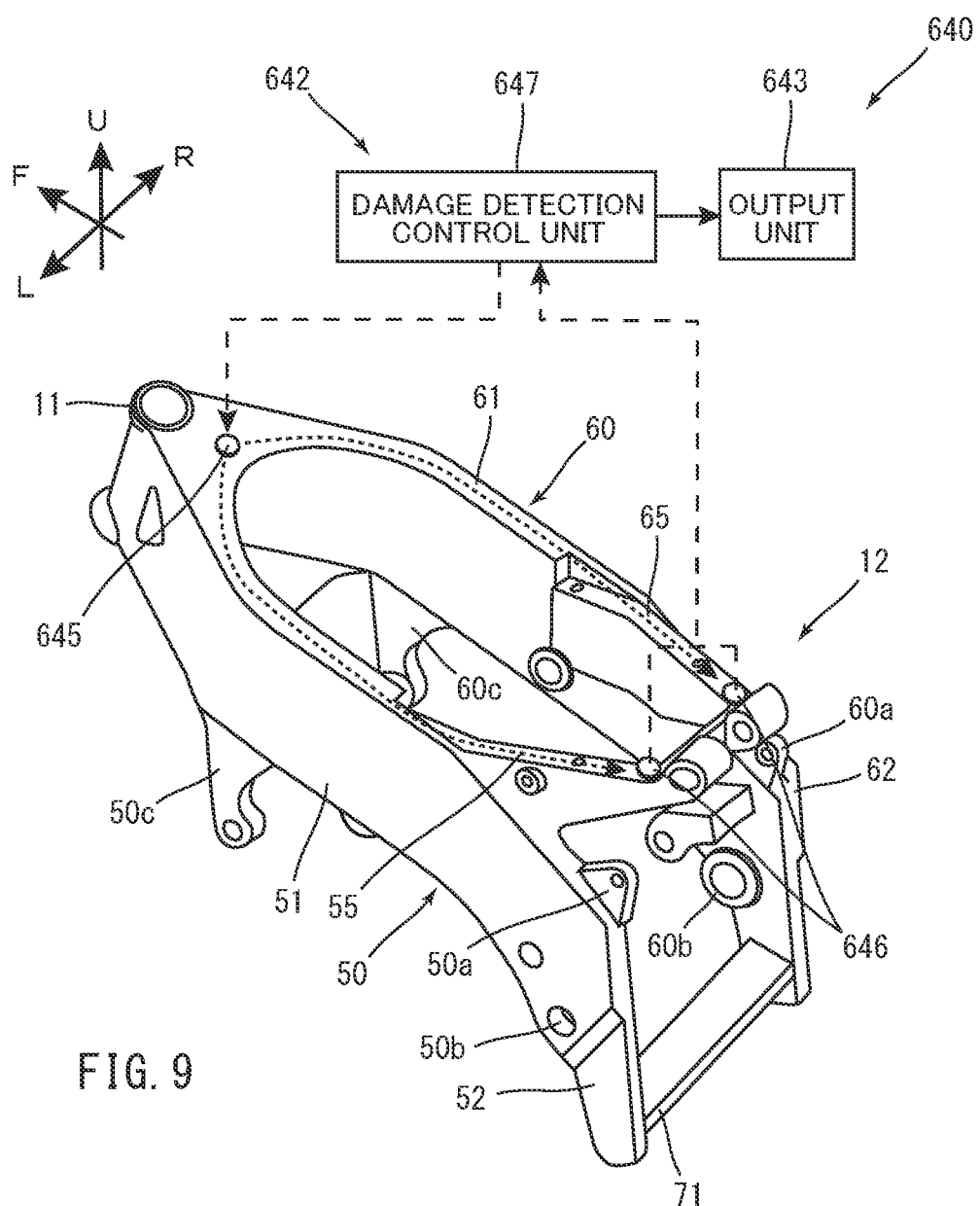
FIG. 9 illustrates an example arrangement of an ultrasonic wave transmission device and an ultrasonic wave detection device when a leaning frame structure damage notification unit according to the fifth embodiment detects damage in a main frame.
Figure 10:
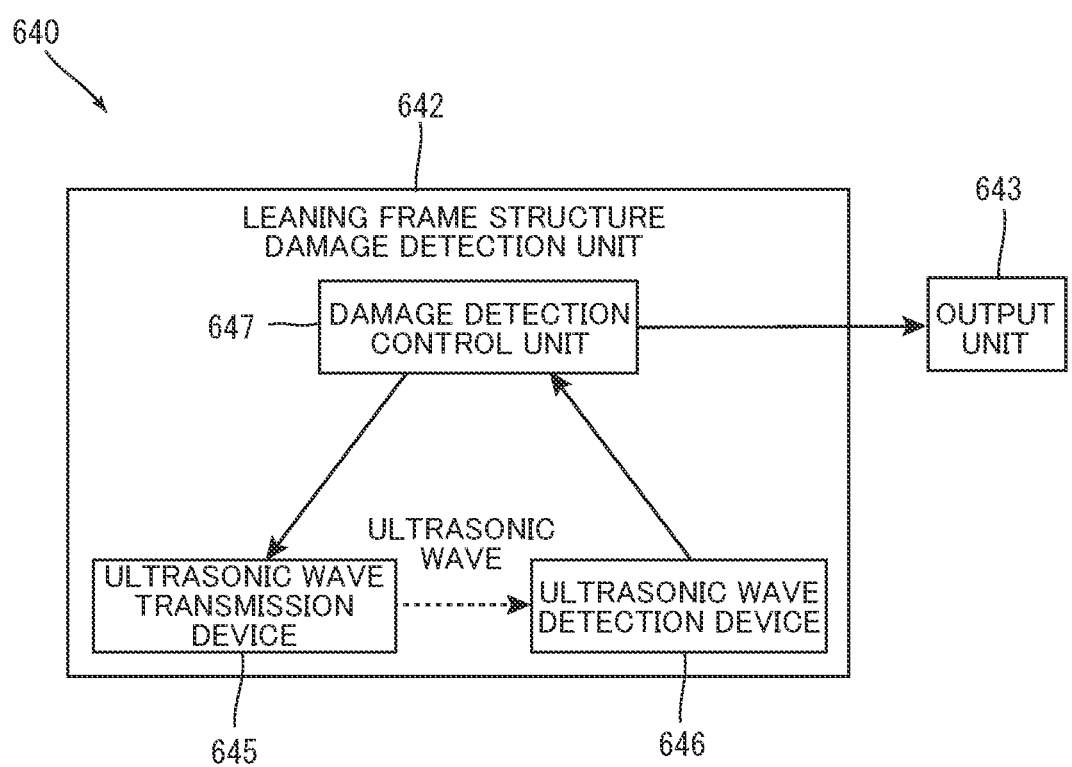
FIG. 10 is a functional block diagram showing a configuration of the leaning frame structure damage notification unit.

In this embodiment, a leaning frame structure damage notification unit 640 detects changes in propagation response of vibrations, such as ultrasonic waves and lamb waves, to detect damage in an inner part of a main frame 12 (leaning frame structure). FIG. 9 is a perspective view showing a schematic configuration of the main frame 12. FIG. 10 is a functional block diagram showing a schematic configuration of the leaning frame structure damage notification unit 640. Note that the leaning frame structure is a structure functioning as a framework of the vehicle, and therefore includes not only bar-like frame members, but also monocoque structure members.

Firstly, the configuration of the main frame 12 will be described with reference to FIG. 9.

<Main Frame>

As shown in FIG. 9, the main frame 12 is connected to a head pipe 11 so as to extend from the head pipe 11 toward the rear of the vehicle. The main frame 12 supports a power unit 8 and some other components. At least a part of a frame 10 is covered with a body cover 5.

The main frame 12 includes a left main frame 50 and a right main frame 60. Each of the left main frame 50 and the right main frame 60 is shaped into a plate extending in the front-rear direction of the vehicle.

More specifically, in this embodiment, the left main frame 50 has a left-main-frame front portion 51 extending rearward and downward from the head pipe 11, and a left-main-frame rear portion 52 extending downward from the rear end of the left-main-frame front portion 51. In addition, the right main frame 60 has a right-main-frame front portion 61 extending rearward and downward from the head pipe 11, and a right-main-frame rear portion 62 extending downward from the rear end of the right-main-frame front portion 61.

Each of the left main frame 50 and the right main frame 60 has a front end connected to the head pipe 11. In other words, the front end of the left-main-frame front portion 51 of the left main frame 50 and the front end of the right-main-frame front portion 61 of the right main frame 60 are connected to each other.

In addition, the rear end of the left-main-frame rear portion 52 of the left main frame 50 and the rear end of the right-main-frame rear portion 62 of the right main frame 60 are connected to each other with a cross member 71 extending in the left-right direction.

The main frame 12 has a left suspension support portion 55 and a right suspension support portion 65 that are formed between the front end and the rear end of the main frame 12 in the front-rear direction, and extend from the left main frame 50 and the right main frame 60, respectively, rearward and upward.

Rear arms, which are not illustrated, are rotatably supported by the left-main-frame rear portion 52 and the right-main-frame rear portion 62. In other words, the front sides of the rear arms are rotatably connected to the rear parts of the left main frame 50 and the right main frame 60. The rear arms rotatably support a rear wheel 4 with their rear parts.

In FIG. 9, reference numerals 50a, 60a indicate mounting portions that are provided to the left main frame 50 and the right main frame 60, respectively, to mount the rear structure. In addition, reference numerals 50b, 60b indicate mounting portions that are provided to the left main frame 50 and the right main frame 60, respectively, to mount the rear arms. Furthermore, reference numerals 50c, 60c indicate mounting portions that are provided to the left main frame 50 and the right main frame 60, respectively, to mount the power unit 8.

The main frame 12 is made of a material containing carbon-fiber-reinforced resin made by reinforcing resin (e.g., epoxy resin, vinyl ester, phenolic resin, polyamide, polypropylene, polyphenylene sulfide, etc.) with carbon fibers. The carbon fibers may be woven or non-woven. In addition, the carbon fibers may be continuous fibers having a predetermined length (e.g., 1 mm) or longer, or discontinuous fibers. Both the continuous fibers and discontinuous fibers can be also used as the carbon fibers.

<Leaning Frame Structure Damage Notification Unit>

As shown in FIGS. 9 and 10, a leaning frame structure damage notification unit 640 in this embodiment has a leaning frame structure damage detection unit 642 and an output unit 643. The leaning frame structure damage detection unit 642 has an ultrasonic wave transmission device 645 that transmits ultrasonic waves, an ultrasonic wave detection device 646 that detects the ultrasonic waves, and a damage detection control unit 647. When the leaning frame structure damage detection unit 642 detects damage in the main frame 12, the output unit 643 notifies the rider or the like of the damage.

FIG. 10 shows the leaning frame structure damage notification unit 640 alone extracted from FIG. 9 in the form of functional blocks.

The ultrasonic wave transmission device 645 is placed on the front side of the main frame 12, which is configured as described above, as shown in FIG. 9. Specifically, the ultrasonic wave transmission device 645 is placed at the intersection where the left main frame 50 and the right main frame 60 are connected to the head pipe 11. The ultrasonic wave transmission device 645 may have any configurations capable of outputting ultrasonic wave signals, such as a macro fiber composite (MFC) actuator and a speaker.

The ultrasonic wave detection device 646 is placed on the rear side of the main frame 12, which is configured as described above, as shown in FIG. 9. Specifically, the ultrasonic wave detection device 646 is placed at the end of each of the left suspension support portion 55 and the right suspension support portion 65. The ultrasonic wave detection device 646 may have any configurations capable of detecting ultrasonic wave signals, such as an acoustic emission (AE) sensor.

In the example shown in FIG. 9, the ultrasonic wave detection devices 646 are placed at the ends of the left suspension support portion 55 and the right suspension support portion 65. However, the ultrasonic wave detection device 646 may be placed at the end of either one of the left suspension support portion 55 and the right suspension support portion 65.

The damage detection control unit 647 causes the ultrasonic wave transmission device 645 to output ultrasonic wave signals successively or regularly. In addition, the damage detection control unit 647 detects damage in an inner part of the main frame 12 based on the ultrasonic wave signal that has been output from the ultrasonic wave transmission device 645 and detected by the ultrasonic wave detection device 646. More specifically, the damage detection control unit 647 determines that the inner part of the main frame 12 has been damaged when the ultrasonic wave signal detected by the ultrasonic wave detection device 646 has a phase different from that of the ultrasonic wave detected when the inner part of the signal main frame 12 is not damaged.

As described above, the leaning frame structure damage detection unit 642 of the leaning frame structure damage notification unit 640 electrically detects an impact that is received by the main frame 12 and damages a non-visible part without damaging a part in the visible range by using the ultrasonic wave transmission device 645, the ultrasonic wave detection device 646, and the damage detection control unit 647.

In addition, the leaning frame structure damage detection unit 642 of the leaning frame structure damage notification unit 640 detects the damage that has occurred in a non-visible part between two points, which are located on the main frame 12 and separated from each other in the front-rear direction.

The damage detection control unit 647 may be a part of a control unit of the vehicle 1, such as an engine control unit (ECU), or may be provided separately from the control unit.

In addition, the damage detection control unit 647 may be, by a wired connection, or wirelessly, communicably connected to the ultrasonic wave transmission device 645 and the ultrasonic wave detection device 646.

By using the leaning frame structure damage notification unit 640 in this embodiment, the damage in the inner part of the main frame 12 can be accurately detected. Therefore, the vehicle 1, which turns in a leaning posture and has the main frame 12 made of a material containing fiber-reinforced resin, is configured to achieve weight reduction and help reduce changes in ride quality.

Modification of Fifth Embodiment

Figure 11:
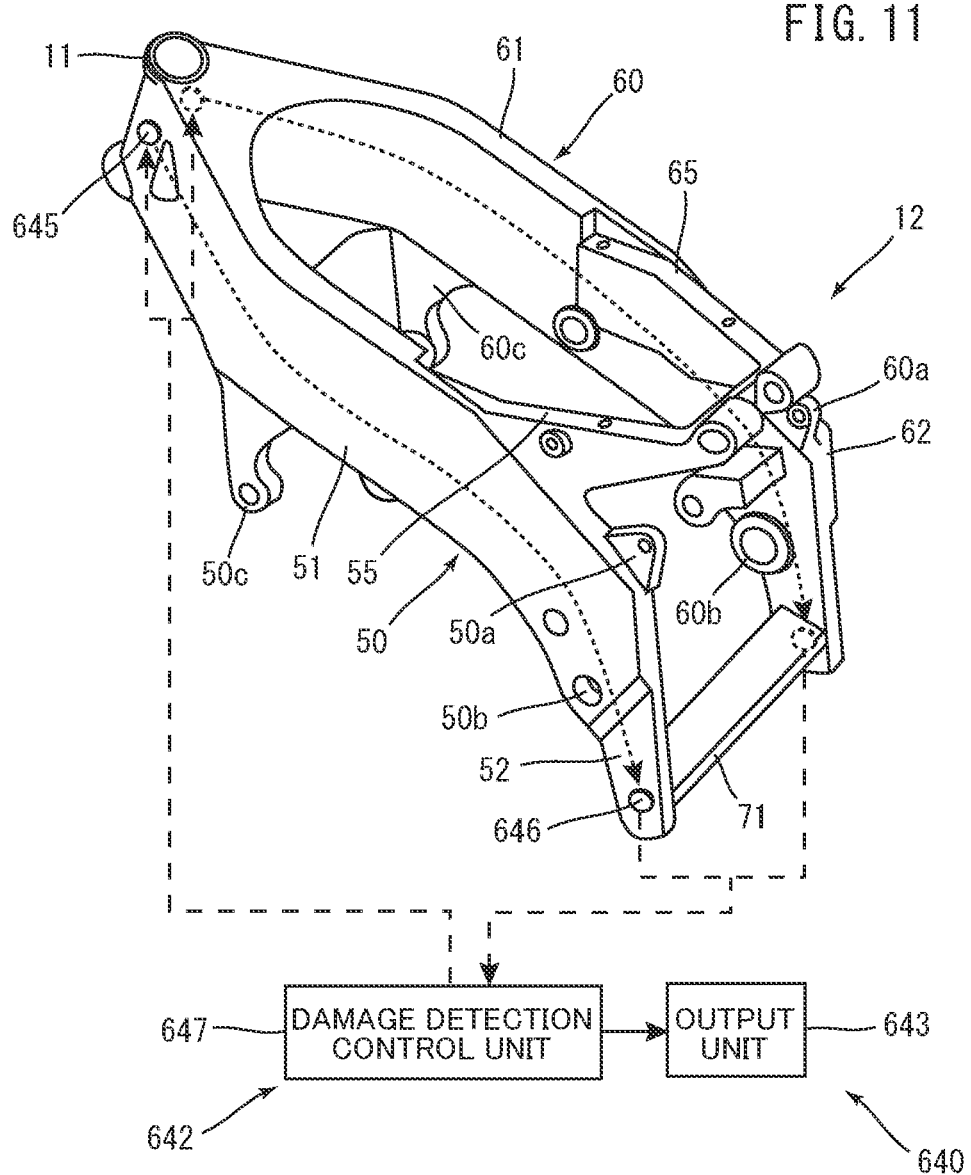
FIG. 11 illustrates another example arrangement of an ultrasonic wave transmission device and an ultrasonic wave detection device of a leaning frame structure damage notification unit according to a modification of the fifth embodiment, and is equivalent to FIG. 9.
Figure 12:
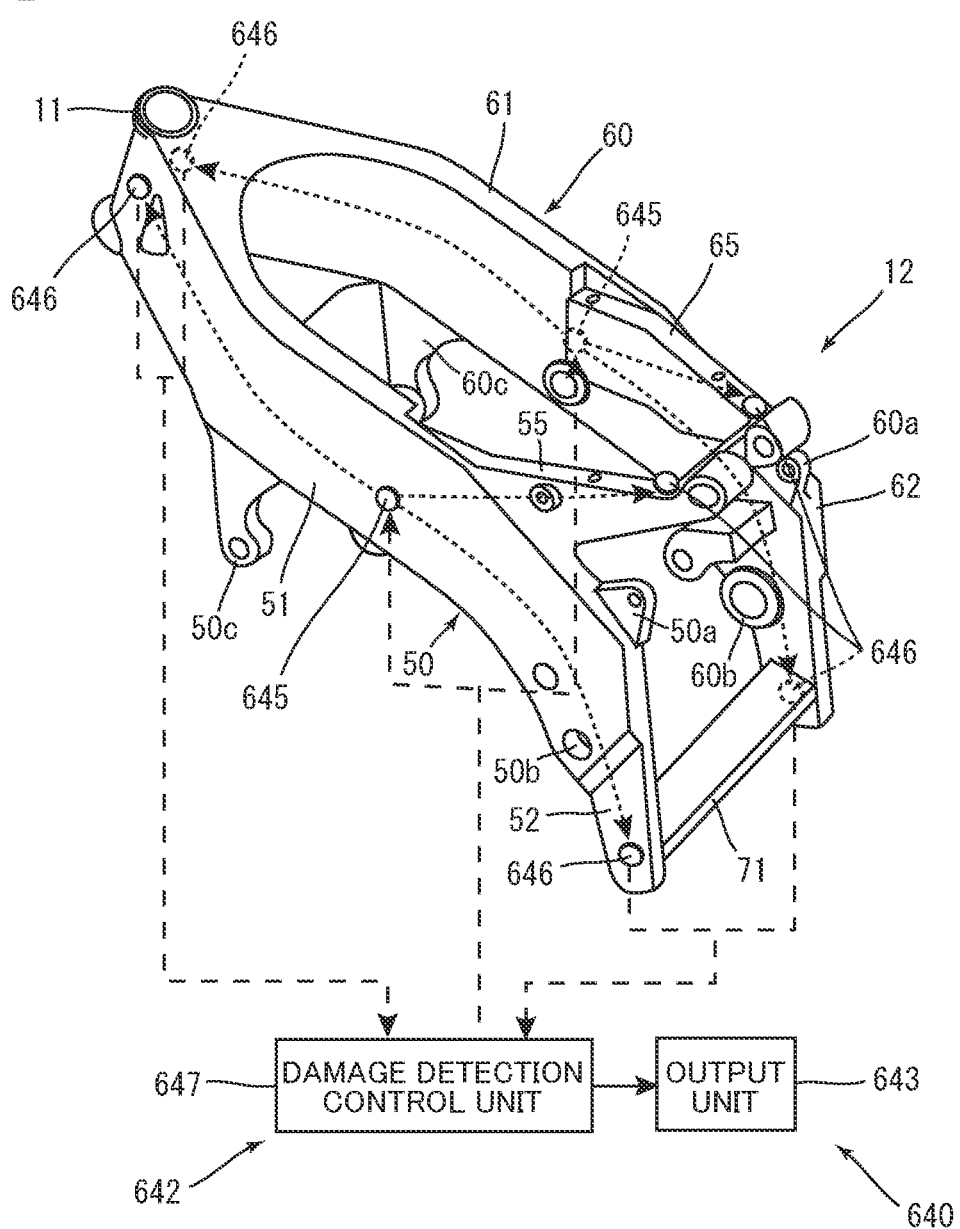
FIG. 12 illustrates another example arrangement of an ultrasonic wave transmission device and an ultrasonic wave detection device of a leaning frame structure damage notification unit according to a modification of the fifth embodiment, and is equivalent to FIG. 9.
Figure 13:
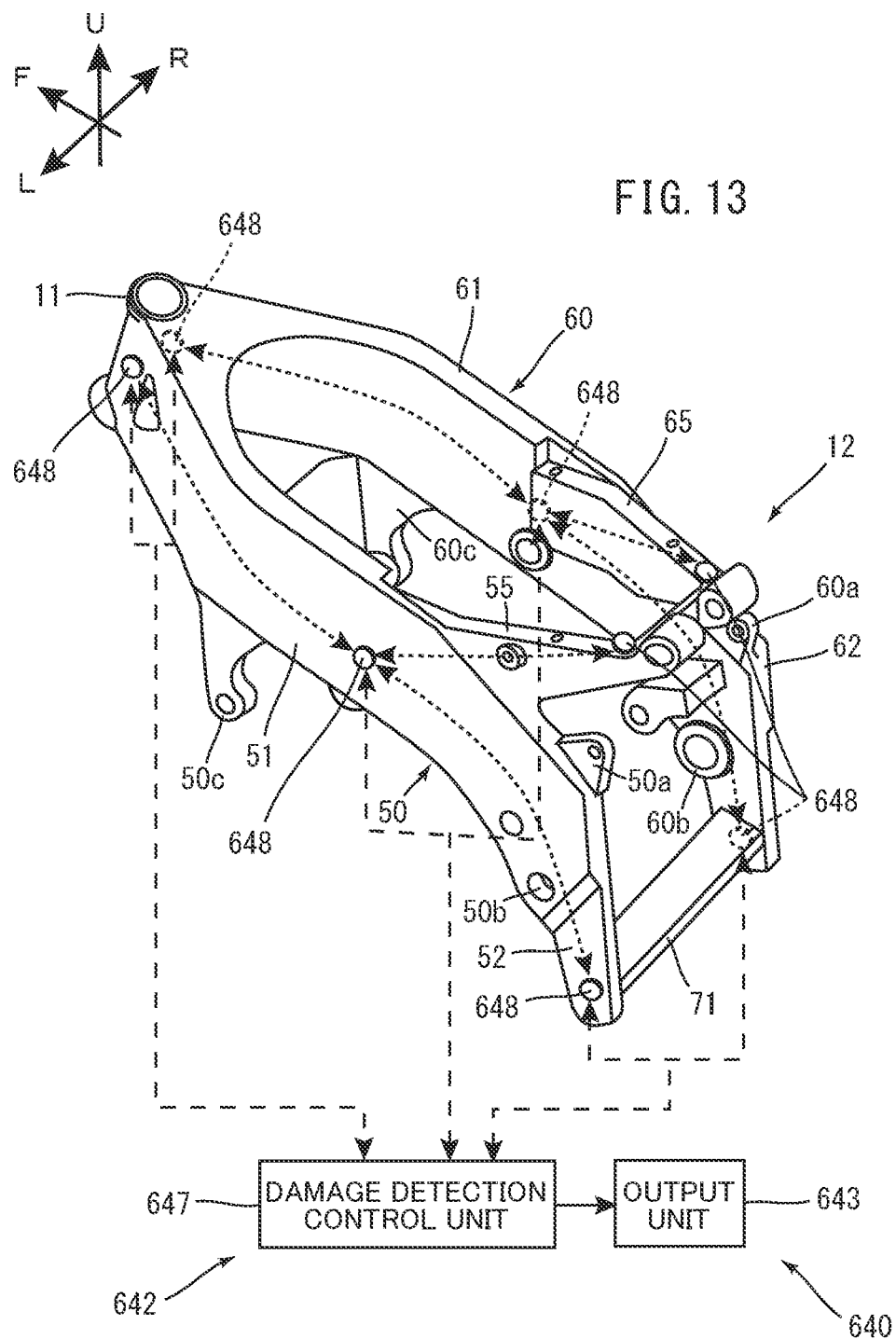
FIG. 13 illustrates another example arrangement of an ultrasonic wave transmission device and an ultrasonic wave detection device of a leaning frame structure damage notification unit according to a modification of the fifth embodiment, and is equivalent to FIG. 9.

FIGS. 11 to 13 show other examples of the leaning frame structure damage notification unit 640 that has the above-described configurations and is mounted on the main frame 12.

In the example shown in FIG. 11, the ultrasonic wave detection device 646 is placed at the rear end of each of the left-main-frame rear portion 52 and the right-main-frame rear portion 62. This arrangement makes it possible to detect the damage that has occurred in an inner part in the front-rear direction of the left main frame 50 and the right main frame 60.

In the example shown in FIG. 12, the ultrasonic wave transmission device 645 is placed at the center part, with respect to the front-rear direction, of each of the left main frame 50 and the right main frame 60. On the other hand, the ultrasonic wave detection device 646 is placed at the front end of the left-main-frame front portion 51, at the rear end of the left-main-frame rear portion 52, and at the end of the left suspension support portion 55, of the left main frame 50. In addition, the ultrasonic wave detection device 646 is placed at the front end of the right-main-frame front portion 61, at the rear end of the right-main-frame rear portion 62, and at the end of the right suspension support portion 65, of the right main frame 60.

This arrangement makes it possible for the leaning frame structure damage notification unit 640 to detect damage that has occurred in an inner part throughout the left main frame 50 and the right main frame 60 in the front-rear direction.

In the example shown in FIG. 13, the ultrasonic wave transmission device and the ultrasonic wave detection device are integrated into a single device 648, and a plurality of the devices 648 are arranged at the same positions as those of the ultrasonic wave transmission device 645 and the ultrasonic wave detection device 646 shown in FIG. 12. Specifically, on the left main frame 50, one of the plurality of devices 648 is placed at the front end of the left-main-frame front portion 51, one at the center part of the left main frame 50 in the front-rear direction, one at the rear end of the left-main-frame rear portion 52, and one at the end of the left suspension support portion 55. In addition, on the right main frame 60, one of the plurality of devices 648 is placed at the front end of the right-main-frame front portion 61, one at the center part of the right main frame 60 in the front-rear direction, one at the rear end of the right-main-frame rear portion 62, and one at the end of the right suspension support portion 65.

Like the example shown in FIG. 12, the above-described configuration in the example shown in FIG. 13 allows the devices 648 placed at the longitudinally center parts of the left main frame 50 and the right main frame 60 to input ultrasonic wave signals, while allowing the devices 648 placed at the other positions to detect the ultrasonic wave signals.

Alternatively, for example, the devices 648 may be arranged such that a device 648 placed at at least one of the left-main-frame front portion 51, the left-main-frame rear portion 52, and the left suspension support portion 55 inputs ultrasonic wave signals, and devices 648 placed at the other positions detect the ultrasonic wave signals. Furthermore, for example, the devices 648 may be arranged such that a device 648 placed at at least one of the right-main-frame front portion 61, the right-main-frame rear portion 62, and the right suspension support portion 65 inputs ultrasonic wave signals, and devices 648 placed at the other positions detect the ultrasonic wave signals.

As described above, in the example shown in FIG. 13, the positions at which the ultrasonic wave signals are input and the positions at which the ultrasonic wave signals are detected are easily interchangeable on the main frame 12, and therefore the damage in an inner part of the main frame 12 can be more reliably detected.

Figure 14:
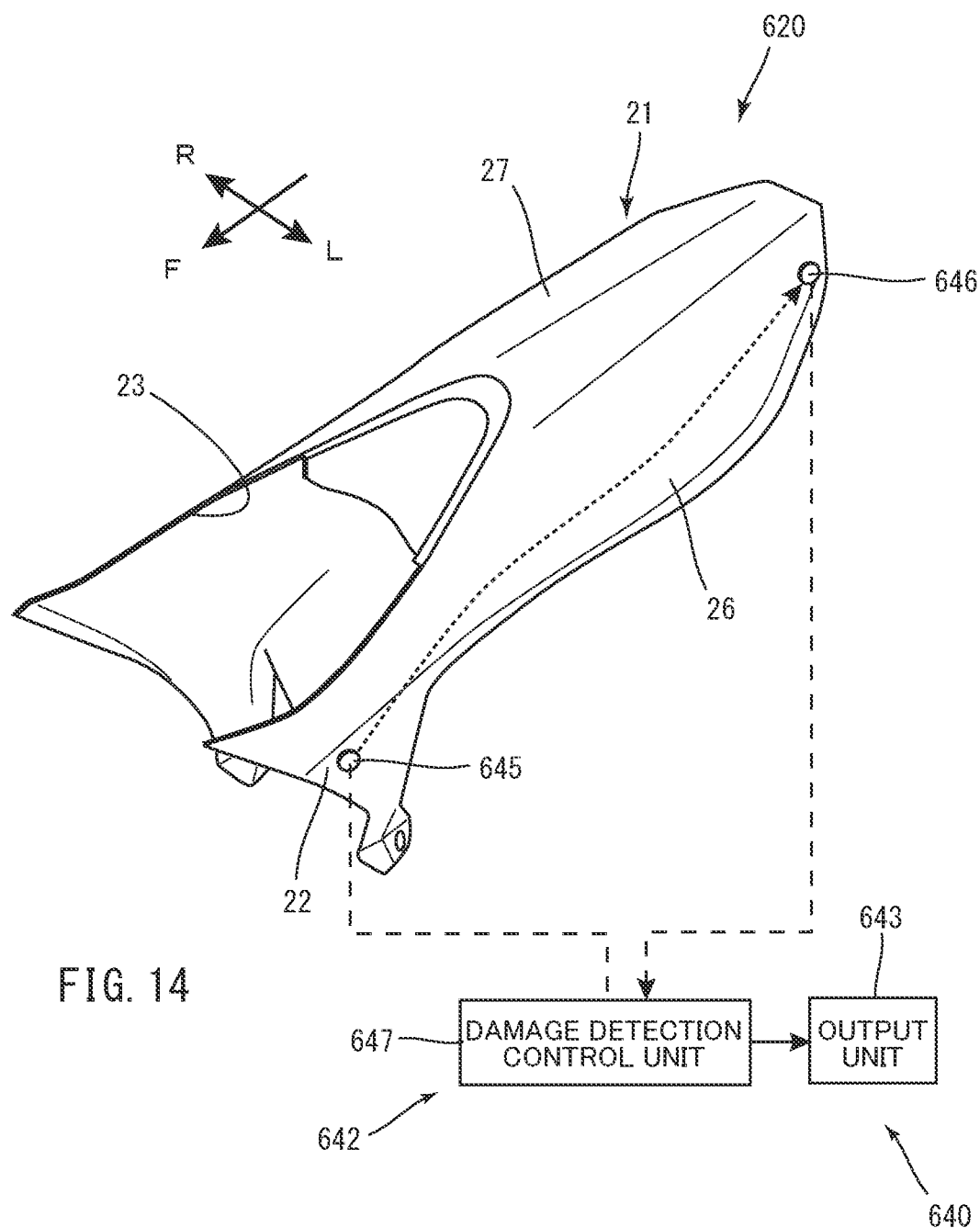
FIG. 14 illustrates another example arrangement of the ultrasonic wave transmission device and the ultrasonic wave detection device of a leaning frame structure damage notification unit according to a modification of the fifth embodiment.

In this embodiment, the ultrasonic wave transmission device 645 and the ultrasonic wave detection device 646 of the leaning frame structure damage notification unit 640 are placed on the main frame 12. However, the ultrasonic wave transmission device 645 and the ultrasonic wave detection device 646 of the leaning frame structure damage notification unit 640 may be placed on the rear structure 620 as shown in FIG. 14. Incidentally, the rear structure 620 is configured in the same manner as the rear structure 20 of the first embodiment, except that the rear structure 620 is not provided with the detection wire 41 of the leaning frame structure damage notification unit 40.

Specifically, as shown in FIG. 14, the ultrasonic wave transmission device 645 is placed at the front end of the rear structure 620, while the ultrasonic wave detection device 646 is placed at the rear end of the rear structure 620. This arrangement of the devices allows the leaning frame structure damage notification unit 640 to detect damage in an inner part of the rear structure 620 using ultrasonic wave signals.

The arrangement of the ultrasonic wave transmission device 645 and the ultrasonic wave detection device 646 on the rear structure 620 is not limited to the example shown in FIG. 14. For instance, the ultrasonic wave transmission device 645 may be placed at the rear end of the rear structure 620, while the ultrasonic wave detection device 646 may be placed at the front end of the rear structure 620. In addition, the ultrasonic wave transmission device 645 may be placed at the center part of the rear structure 620 in the front-rear direction, while the ultrasonic wave detection devices 646 may be placed at the front end and rear end of the rear structure 620. Furthermore, the ultrasonic wave detection device 646 may be placed at the center part of the rear structure 620 in the front-rear direction, while the ultrasonic wave transmission device 645 may be placed at the front end and the rear end of the rear structure 620.

The ultrasonic wave transmission device 645 and the ultrasonic wave detection device 646 in FIG. 14 may be also implemented by a device having the same configuration as that in the example shown in FIG. 13.

Other Embodiments

Although embodiments of the present teaching have been described above, the above embodiments are merely examples that can be used to carry out the present teaching. Thus, the present teaching is not limited to the above embodiments, which can be modified as necessary without departing from the spirit of the teaching.

In each of the above-described embodiments, the vehicle body 2 includes the frame 10, and the rear structure 20, 120, 220, or 620 having a monocoque structure. However, the frame 10 also may have the monocoque structure.

The rear structures 20, 120, 220, 620 of the above-described embodiments are made of a material containing carbon-fiber-reinforced resin made by reinforcing resin with carbon fibers. However, the rear structures 20, 120, 220, 620 may be made of a material containing fiber-reinforced resin made by reinforcing resin with fibers other than the carbon fibers (e.g., aramid fibers, polyethylene fibers, and glass fibers). Also, the rear structures 20, 120, 220, 620 in the above described embodiments contain resin, such as epoxy resin, vinyl ester, phenolic resin, polyamide, polypropylene, and polyphenylene sulfide. The resin may be any other kinds of resin that can be reinforced with fibers.

A part of the rear structures 20, 120, 220, 620 may be made of a material different from the material making up the other part thereof.

In the above-described embodiments, the rear structures 20, 120, 220, 620 have a space inside. Instead, inside the rear structures 20, 120, 220, 620, there may be placed a shock absorber, such as foam.

In the above-described embodiments, the frame 10 includes the head pipe 11 and the main frame 12. However, the frame 10 may include frames other than the head pipe 11 and the main frame 12.

In the above-described embodiments, the leaning frame structure damage notification unit 340 detects an impact that is received by the rear structure 20 and damages a non-visible part without damaging a part in the visible range, and notifies the rider or the like of the damage. In addition, when the rear structure 20 or the main frame 12 receives an impact and is damaged, the leaning frame structure damage notification units 40, 540, 640 and the damage notification layers 130, 230 detect the damage and notify the rider or the like of the damage.

However, the leaning frame structure damage notification unit and the damage notification layer may be configured to detect an impact received by a leaning frame structure other than the rear structure or damage caused by the impact, and notify the rider or the like of the damage.

Alternatively, the leaning frame structure damage notification unit and the damage notification layer may be configured to, when the main frame 12 or the rear structure 20 receives an impact that damages a non-visible part, or the non-invisible part is damaged, detect the damage even if the damage occurs in a part in the visible range on the main frame 12 and the rear structure 20, and notify the rider or the like of the damage.

In the first embodiment, the detection wire 41 of the leaning frame structure damage notification unit 40 is provided to the left projecting portion 26 and the right projecting portion 27 of the rear structure 20. In the second and third embodiments, the damage notification layers 130, 230 are provided in the left and right projecting portions of the rear structures 120, 220, respectively. However, the detection wire 41 of the leaning frame structure damage notification unit 40 may be provided to one of the left projecting portion 26 and the right projecting portion 27 of the rear structure 20, and either of the damage notification layers 130, 230 may be provided to the other projecting portion. Alternatively, the damage notification layer 130 may be provided to one of the left projecting portion and the right projecting portion of the rear structure, and the damage notification layer 230 may be provided to the other projecting portion.

In the first embodiment, the detection wire 41 is provided to each of the left projecting portion 26 and the right projecting portion 27 of the rear structure 20. The vehicle 1 may be provided with the broken-wire detection unit 42 and the output unit 43 for each of the detection wires 41. More specifically, the vehicle 1 may be provided with a left broken-wire detection unit for detecting a break in the detection wire 41, which is provided to the left projecting portion 26, and a left notification unit. The vehicle 1 may be provided with a right broken-wire detection unit for detecting a break in the detection wire 41, which is provided to the right projecting portion 27, and a right notification unit.

Figure 15:
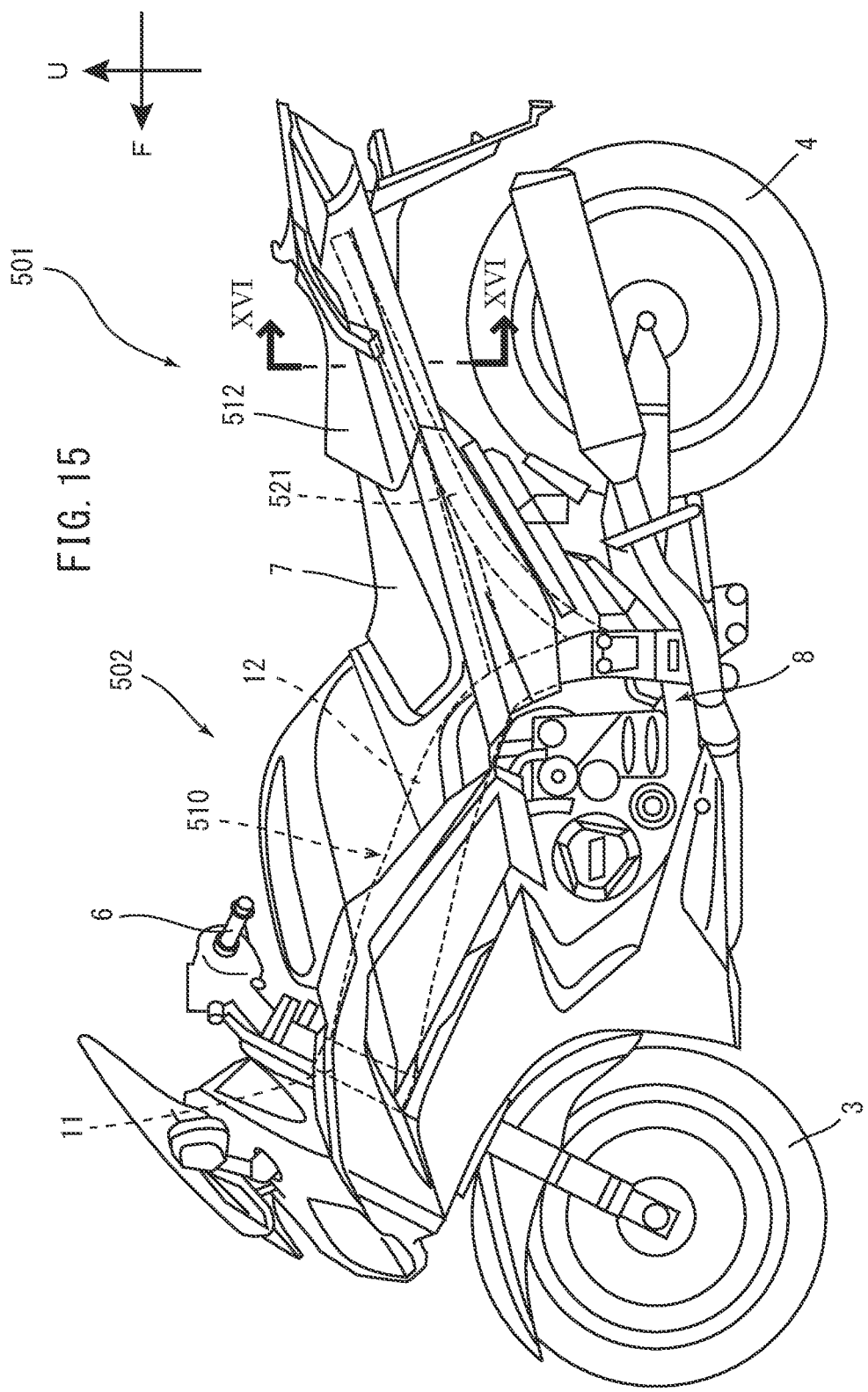
FIG. 15 illustrates a vehicle according to other embodiments, and is equivalent to FIG. 1.

In the first embodiment, the vehicle body 2 includes the frame 10, and the rear structure 20. The rear structure 20 is provided with the leaning frame structure damage notification unit 40. However, the leaning frame structure damage notification unit may be provided on a frame covered with a body cover. As an example of the leaning frame structure damage notification unit provided to the frame covered with the body cover, description will be made about a leaning frame structure damage notification unit 540 provided to a frame 510 of a vehicle 501 equipped with a seat rail 521 as shown in FIG. 15. Note that the structure for mounting the leaning frame structure damage notification unit on the frame 10 and the operation of the leaning frame structure damage notification unit in the first embodiment are made the same as described below.

In the following, like components are denoted by like numerals or symbols as those in the first embodiment and will not be reiterated, and only the components different from the first embodiment will be described.

As shown in FIG. 15, the vehicle 501 includes a vehicle body 502 that has a frame 510, a body cover 512, handlebars 6, a seat 7, and a power unit 8. The frame 510 includes a head pipe 11, a main frame 12, and a seat rail 521. The body cover 512 is mounted on the frame 510 so as to cover the frame 510. At least a part of the body cover 512 constitutes an outermost surface of the vehicle 501.

Figure 16:
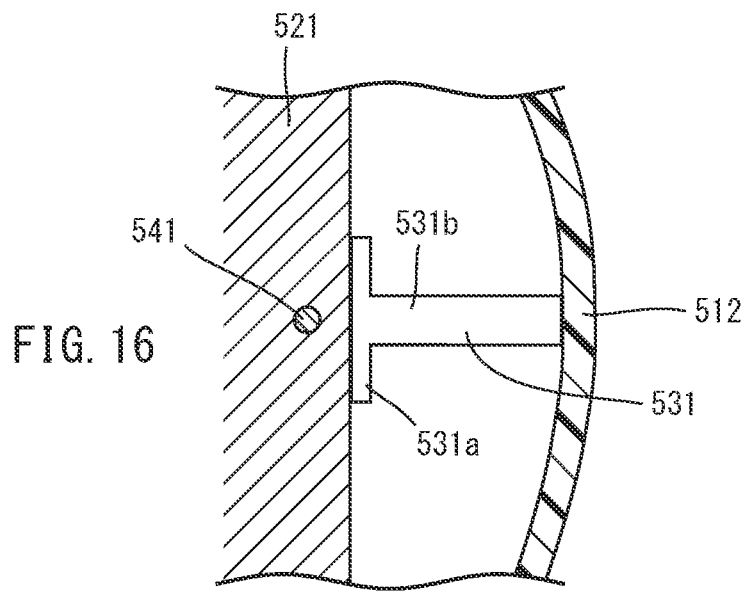
FIG. 16 shows a part of a cross-section taken along Line XVI-XVI in FIG. 15.

FIG. 16 schematically illustrates the mounting structure of the body cover 512 to the seat rail 521. As an example of the leaning frame structure damage notification unit 540 provided to the frame 510, a description will be made about a leaning frame structure damage notification unit 540 provided to the seat rail 521.

As shown in FIG. 16, the body cover 512 is mounted on the seat rail 521 with a mounting member 531. Specifically, the mounting member 531 has a mounting portion 531a that is mounted on the seat rail 521, and a support portion 531b that supports the body cover 512. The support portion 531b is shaped like a column. The mounting portion 531a is a flange provided on axial one side of the support portion 531b. The mounting portion 531a is connected to the seat rail 521 with a bolt or the like (not shown). The axially other side of the support portion 531b is connected to the body cover 512 with a bolt or the like (not shown).

The configuration of the mounting member 531 is not limited to the above-described configuration, and can have any configuration capable of connecting the seat rail 521 to the body cover 512. For instance, the mounting member may have mounting portions at the longitudinally opposite ends to be connected to the body cover 512 and the seat rail 521, respectively.

Although the mounting structure described in this embodiment is used to mount the body cover 512 on the seat rail 521, the same mounting structure is applied to mount the body cover 512 to other members of the frame 510.

In this embodiment, the body cover 512 mounted on the seat rail 512 projects in the left direction and the right direction, and therefore the body cover 512 makes contact with the ground or the like when the vehicle 501 falls over in the left direction or the right direction. The impact may sometimes reach the seat rail 521 through the body cover 512.

Like the rear structure 20 in the first embodiment, the seat rail 521 of the frame 510 in this embodiment is made of a material containing carbon-fiber-reinforced resin made by reinforcing resin (e.g., epoxy resin, vinyl ester, phenolic resin, polyamide, polypropylene, polyphenylene sulfide, etc.) with carbon fibers. The carbon fibers may be woven or non-woven. In addition, the carbon fibers may be continuous fibers having a predetermined length (e.g., 1 mm) or longer, or discontinuous fibers. Both the continuous fibers and discontinuous fibers can be also used as the carbon fibers. The main frame 12 of the frame 510 may be also made of a material containing carbon-fiber-reinforced resin as with the seat rail 521.

As described above, when the aforementioned impact is applied to the seat rail 521 made of the material containing carbon-fiber-reinforced resin, cases may exist where the outer surface of the seat rail 521 does not suffer deformation and breakage. In such cases, however, the inner part of the seat rail 521 may be partially damaged.

Figure 17:
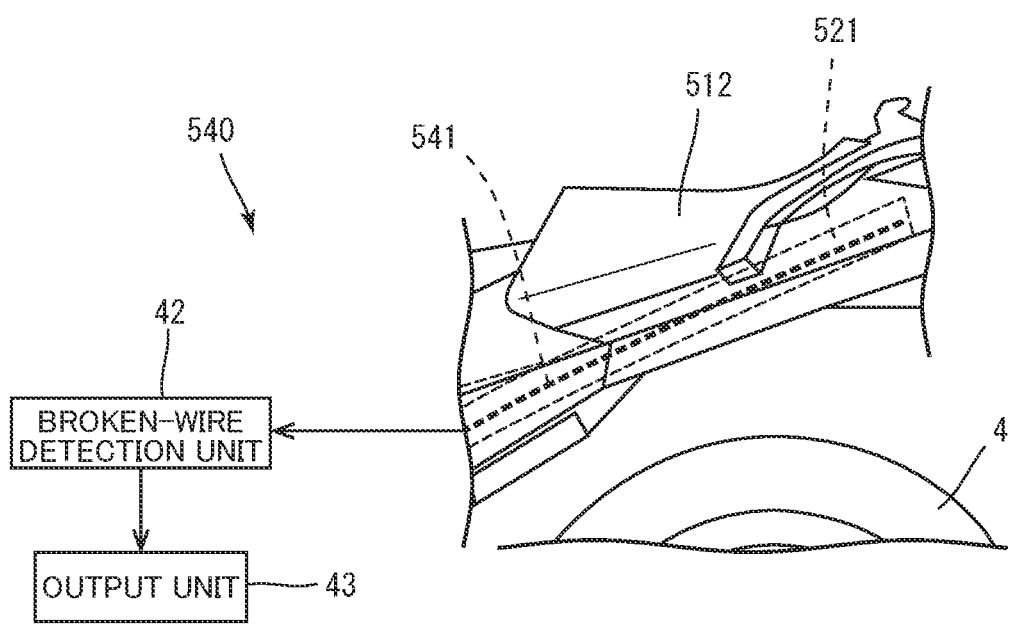
FIG. 17 schematically illustrates a configuration of a leaning frame structure damage notification unit of a vehicle according to the other embodiments.

In this embodiment, as shown in FIG. 17, the vehicle 501 includes the leaning frame structure damage notification unit 540 that detects damage in an inner part of the seat rail 521 and makes a notification of the damage. The leaning frame structure damage notification unit 540 includes a leaning frame structure damage detection unit and an output unit 43. The leaning frame structure damage detection unit includes a detection wire 541 (state changing portion), a broken-wire detection unit 42 (leaning frame structure damage detection control unit), and detection terminals located at the opposite ends of the detection wire 541. The leaning frame structure damage notification unit 540 detects a break in the detection wire 541 through the broken-wire detection unit 42, and notifies the rider or the like of the detection result through the output unit 43. Since the leaning frame structure damage notification unit 540 has the same configuration as that of the leaning frame structure damage notification unit 40 in the first embodiment, the details will be omitted.

The detection wire 541 is placed in an inner part of the seat rail 521, and overlaps the mounting member 531 as viewed from a side of the vehicle 1. The detection wire 541 provided in the inner part of the seat rail 521 runs along the seat rail 521. The detection wire 541 is formed in a closed loop such that predetermined signals flow. The detection wire 541 is electrically connected to the broken-wire detection unit 42.

When the vehicle 501, which is equipped with the leaning frame structure damage notification unit 540 configured as described above, falls over in the left direction or the right direction during a stop and receives an impact, the impact breaks the detection wire 541 in the inner part of the seat rail 521 (predetermined state change of the state changing portion). In short, the detection wire 541 breaks when only the inner part (non-visible part) of the seat rail 521 is damaged, but the surface (part in the visible range) thereof is not damaged.

When the detection wire 541 is broken as described above, the output unit 43 notifies the rider or the like of the possibility of the damage in the inner part of the seat rail 521. Even if the seat rail 521 that cannot be seen due to the presence of the body cover 512 is damaged, the rider or the like can be notified.

The above description has been made to explain the configuration of the leaning frame structure damage notification unit 540 provided to the seat rail 521. However, the same configuration can be applied to the leaning frame structure damage notification unit that is provided to other members of the frame 510, such as the main frame 12.

In the second embodiment, the damage notification layer 130 provided in an inner side of the wall portion 120a of the rear structure 120 is a resin layer that is different in color from the carbon-fiber-reinforced resin. However, the damage notification layer 130 may be made of a material that emits light when a force of a predetermined magnitude or greater acts on the inner side of the wall portion 120a of the rear structure 120 as with the third embodiment.

In the fourth embodiment, the detection unit 341 detects an impact received by the rear structure 20 when the vehicle 301 falls over in the left direction or the right direction during a stop. However, when the frame 10 is made of a material containing fiber-reinforced resin made by reinforcing resin with fibers, such as carbon fibers, it is preferable to configure the detection unit 341 to detect an impact received by the frame 10. Specifically, it is preferable to configure the detection unit 341 to detect an impact that occurs at a part, which is a part of the leaning frame structure making up the vehicle body and is made of a material containing the fiber-reinforced resin, when the vehicle 301 falls over in the left direction or the right direction during a stop.

In the fourth embodiment, the detection unit 341 directly detects an impact received by the frame 10 and the rear structure 20. However, the detection unit 341 may be a tilt angle sensor that indirectly detects an impact received by the frame 10 and the rear structure 20. The detection unit 341 implemented by a tilt angle sensor can detect changes in posture of the vehicle 301. Thus, the detection unit 341 can detect the fall of the vehicle 301 in the left direction or the right direction during a stop. Therefore, it can be anticipated that the frame 10 and the rear structure 20 have received an impact when the vehicle 301 fell over in the left direction or the right direction.

In the case where the detection unit 341 is a tilt angle sensor, the detection unit 341 outputs a fall signal to the control unit 342 when detecting a posture change equivalent to a fall of the vehicle 301 in the left direction or the right direction. The control unit 342 generates a notification signal upon receipt of the fall signal, and outputs the notification signal. The output unit 343 makes a notification to the rider or the like when receiving the notification signal.

In the fifth embodiment, the leaning frame structure damage notification unit 640 detects damage in an inner part of the main frame 12 or the rear structure 620 by detecting changes in propagation response of ultrasonic waves in the main frame 12 or the rear structure 620. However, the leaning frame structure damage notification unit may utilize the propagation response of vibrations of lamb waves or the like to detect damage in the inner part of the main frame 12 or the rear structure 620. Alternatively, the leaning frame structure damage notification unit may be configured to detect changes in electric resistance in the inner part of the rear structure 620.

The vehicles 1, 301, 501 described in the above embodiments are a two-wheeled motorcycle as an example; however, the vehicles 1, 301, 501 may be any types of leaning vehicles that turn in a leaning posture, including two-wheeled motorcycles driven by a power source other than engines, bicycles, and tricycles.

REFERENCE SIGNS LIST 1, 301, 501 vehicle
2, 502 vehicle body
5, 512 body cover
10, 510 frame
20, 120, 220, 620 rear structure
20a, 120a, 220a wall portion
21 main body
22 connecting portion
26 left projecting portion
27 right projecting portion
40, 340, 540, 640 leaning frame structure damage notification unit
41, 541 detection wire (state changing portion)
41a, 41b detection terminal
42 broken-wire detection unit (leaning frame structure damage detection control unit)
43, 343, 643 output unit
45, 642 leaning frame structure damage detection unit
130, 230 damage notification layer (leaning frame structure damage notification unit, state portion)
341 detection unit
342 control unit
521 seat rail
541 detection wire
645 ultrasonic wave transmission device
646 ultrasonic wave detection device
647 damage detection control unit

What is claimed is:

1. A leaning vehicle turning in a leaning posture comprising:
   a leaning frame structure that, with respect to a left-right direction of the leaning vehicle, leans left during a left turn, and leans right during a right turn, and is made of a material containing fiber-reinforced resin; and
   a leaning frame structure damage notification unit that, when the leaning frame structure receives an impact caused by a fall of the leaning vehicle in a left direction or a right direction, in a case where the impact causes damage to a non-visible part of the leaning frame structure without damaging a part in a visible range of the leaning frame structure, makes a notification of the damage,
   wherein
      the leaning frame structure damage notification unit includes a leaning frame structure damage detection unit and an output unit,
      the leaning frame structure damage detection unit detects the damage caused to the non-visible part of the leaning frame structure without damaging the part in the visible range of the leaning frame structure, and
      the leaning frame structure damage detection unit includes an ultrasonic wave transmission device that transmits ultrasonic wave signals, an ultrasonic wave detection device that detects the ultrasonic wave signals, and a damage detection control unit,
      the damage detection control unit detecting changes in propagation response of ultrasonic wave signals propagating between two points in the leaning frame structure as viewed in the left-right direction and detecting damage in the non-visible part of the leaning frame structure, based on ultrasonic wave signals that have been output successively or regularly from the ultrasonic wave transmission device and are detected by the ultrasonic wave detection device, and
   the output unit making a notification of the damage that is detected by the damage detection control unit, or
   wherein the leaning frame structure damage notification unit includes a state changing portion,
   the state changing portion, when an inner part of the leaning frame structure receives the impact that causes the damage thereto, causes a predetermined changes in color, the state changing portion being
      a layer that is provided inside the leaning frame structure, and has a color different from a color of the fiber-reinforced resin, or
      a layer that is provided in inside the leaning frame structure, and changes its color when a force is applied to the inner part of the leaning frame structure,
   and
   the leaning frame structure damage notification unit makes a notification of the damage that has been caused in the inner part of the leaning frame structure without damaging the part in the visible range of the leaning frame structure, based on the predetermined change in color in the state changing portion.

2. The leaning vehicle according to claim 1, wherein the leaning frame structure damage notification unit includes a detection unit that directly, indirectly, or electrically detects the impact that is received by the leaning frame structure and causes the damage to the non-visible part of the leaning frame structure.

3. The leaning vehicle according to claim 2, wherein the detection unit directly detects the impact that is received by the leaning frame structure and causes the damage to the non-visible part of the leaning frame structure.

4. The leaning vehicle according to claim 2, wherein the detection unit indirectly detects the impact that is received by the leaning frame structure and causes the damage to the non-visible part without damaging a part in a visible range.

5. The leaning vehicle according to claim 1, wherein the fiber-reinforced resin is carbon-fiber-reinforced resin made by reinforcing resin with carbon fibers.

6. The leaning vehicle according to claim 2, wherein the fiber-reinforced resin is carbon-fiber-reinforced resin made by reinforcing resin with carbon fibers.

7. The leaning vehicle according to claim 3, wherein the fiber-reinforced resin is carbon-fiber-reinforced resin made by reinforcing resin with carbon fibers.

8. The leaning vehicle according to claim 4, wherein the fiber-reinforced resin is carbon-fiber-reinforced resin made by reinforcing resin with carbon fibers.

* * * * *